(12) United States Patent
Kennewick et al.

(10) Patent No.: US 7,693,720 B2
(45) Date of Patent: *Apr. 6, 2010

(54) MOBILE SYSTEMS AND METHODS FOR RESPONDING TO NATURAL LANGUAGE SPEECH UTTERANCE

(75) Inventors: Robert A. Kennewick, Seattle, WA (US); David Locke, Redmond, WA (US); Michael R. Kennewick, Sr., Bellevue, WA (US); Michael R. Kennewick, Jr., Bellevue, WA (US); Richard Kennewick, Woodinville, WA (US); Tom Freeman, Mercer Island, WA (US); Stephen F. Elston, Seattle, WA (US)

(73) Assignee: VoiceBox Technologies, Inc., Kirkland, WA (US)

( * ) Notice: Subject to any disclaimer, the term of this patent is extended or adjusted under 35 U.S.C. 154(b) by 950 days.

This patent is subject to a terminal disclaimer.

(21) Appl. No.: 10/618,633

(22) Filed: Jul. 15, 2003

(65) Prior Publication Data

US 2004/0193420 A1 Sep. 30, 2004

Related U.S. Application Data

(60) Provisional application No. 60/395,615, filed on Jul. 15, 2002.

(51) Int. Cl.
*G10L 21/00* (2006.01)
*G10L 15/18* (2006.01)
*G10L 13/00* (2006.01)

(52) U.S. Cl. .............. 704/275; 257/270; 257/270.1
(58) Field of Classification Search ............. 704/270, 704/270.1, 275, 257; 709/202
See application file for complete search history.

(56) References Cited

U.S. PATENT DOCUMENTS 4,430,669 A 2/1984 Cheung ............... 358/122

(Continued)

FOREIGN PATENT DOCUMENTS

WO      WO 01/78065      10/2001

OTHER PUBLICATIONS

Lin et al., "A Distributed Architecture for Cooperative Spoken Dialogue Agents With Coherent Dialogue State and History", ASRU'99, 1999.*

(Continued)

*Primary Examiner*—James S Wozniak
(74) *Attorney, Agent, or Firm*—Pillsbury Winthrop Shaw Pittman LLP

(57) ABSTRACT

Mobile systems and methods that overcomes the deficiencies of prior art speech-based interfaces for telematics applications through the use of a complete speech-based information query, retrieval, presentation and local or remote command environment. This environment makes significant use of context, prior information, domain knowledge, and user specific profile data to achieve a natural environment for one or more users making queries or commands in multiple domains. Through this integrated approach, a complete speech-based natural language query and response environment can be created. The invention creates, stores and uses extensive personal profile information for each user, thereby improving the reliability of determining the context and presenting the expected results for a particular question or command. The invention may organize domain specific behavior and information into agents, that are distributable or updateable over a wide area network. The invention can be used in dynamic environments such as those of mobile vehicles to control and communicate with both vehicle systems and remote systems and devices.

55 Claims, 6 Drawing Sheets

Speech Processing System Block Diagram

U.S. PATENT DOCUMENTS

| | | | | |
|---|---|---|---|---|
| 5,155,743 | A | 10/1992 | Jacobs | 375/28 |
| 5,274,560 | A | 12/1993 | LaRue | 364/444 |
| 5,377,350 | A | 12/1994 | Skinner | 395/600 |
| 5,386,556 | A | 1/1995 | Hedin et al. | 395/600 |
| 5,424,947 | A | 6/1995 | Nagao et al. | 364/419.08 |
| 5,471,318 | A | 11/1995 | Ahuja et al. | 358/400 |
| 5,475,733 | A | 12/1995 | Eisdorfer et al. | 379/52 |
| 5,499,289 | A | 3/1996 | Bruno et al. | 379/220 |
| 5,500,920 | A | 3/1996 | Kupiec | 395/2.79 |
| 5,517,560 | A | 5/1996 | Greenspan | 379/114 |
| 5,533,108 | A | 7/1996 | Harris et al. | 379/201 |
| 5,537,436 | A | 7/1996 | Bottoms et al. | 375/222 |
| 5,539,744 | A | 7/1996 | Chu et al. | 370/60 |
| 5,557,667 | A | 9/1996 | Bruno et al. | 379/201 |
| 5,563,937 | A | 10/1996 | Bruno et al. | 379/201 |
| 5,590,039 | A | 12/1996 | Ikeda et al. | 395/759 |
| 5,617,407 | A | 4/1997 | Bareis | 369/275.3 |
| 5,633,922 | A | 5/1997 | August et al. | 379/220 |
| 5,675,629 | A | 10/1997 | Raffel et al. | 379/58 |
| 5,696,965 | A | 12/1997 | Dedrick | 395/610 |
| 5,708,422 | A | 1/1998 | Blonder et al. | 340/825.34 |
| 5,721,938 | A | 2/1998 | Stuckey | 395/754 |
| 5,722,084 | A | 2/1998 | Chakrin et al. | 455/551 |
| 5,742,763 | A | 4/1998 | Jones | 395/200.3 |
| 5,752,052 | A | 5/1998 | Richardson et al. | 395/759 |
| 5,754,784 | A | 5/1998 | Garland et al. | 395/200.49 |
| 5,761,631 | A | 6/1998 | Nasukawa | 704/9 |
| 5,774,859 | A | 6/1998 | Houser et al. | 704/275 |
| 5,794,050 | A | 8/1998 | Dahlgren et al. | 395/708 |
| 5,797,112 | A | 8/1998 | Komatsu et al. | 701/201 |
| 5,799,276 | A | 8/1998 | Komissarchik et al. | 704/251 |
| 5,802,510 | A | 9/1998 | Jones | 707/2 |
| 5,832,221 | A | 11/1998 | Jones | 375/200.36 |
| 5,878,385 | A | 3/1999 | Bralich et al. | 704/9 |
| 5,878,386 | A | 3/1999 | Coughlin | 704/10 |
| 5,892,813 | A * | 4/1999 | Morin et al. | 379/88.01 |
| 5,895,466 | A | 4/1999 | Goldberg et al. | 707/5 |
| 5,902,347 | A | 5/1999 | Backman et al. | 701/200 |
| 5,911,120 | A | 6/1999 | Jarett et al. | 455/417 |
| 5,918,222 | A | 6/1999 | Fukui et al. | 707/1 |
| 5,926,784 | A | 7/1999 | Richardson et al. | 704/9 |
| 5,933,822 | A | 8/1999 | Braden-Harder et al. | 707/5 |
| 5,953,393 | A | 9/1999 | Culbreth et al. | 379/88.25 |
| 5,963,894 | A | 10/1999 | Richardson et al. | 704/9 |
| 5,963,940 | A | 10/1999 | Liddy et al. | 707/5 |
| 5,987,404 | A | 11/1999 | Della Pietra et al. | 704/9 |
| 5,991,721 | A | 11/1999 | Asano et al. | 704/257 |
| 5,995,119 | A | 11/1999 | Cosatto et al. | 345/473 |
| 6,009,382 | A | 12/1999 | Martino et al. | 704/1 |
| 6,014,559 | A | 1/2000 | Amin | 455/413 |
| 6,021,384 | A | 2/2000 | Gorin et al. | 704/1 |
| 6,044,347 | A | 3/2000 | Abella et al. | 704/272 |
| 6,049,602 | A | 4/2000 | Foladare et al. | 379/265 |
| 6,058,187 | A | 5/2000 | Chen | 380/21 |
| 6,078,886 | A | 6/2000 | Dragosh et al. | 704/270 |
| 6,081,774 | A | 6/2000 | De Hita et al. | 704/9 |
| 6,101,241 | A | 8/2000 | Boyce et al. | 379/88.01 |
| 6,119,087 | A | 9/2000 | Kuhn et al. | 704/270 |
| 6,134,235 | A | 10/2000 | Goldman et al. | 370/352 |
| 6,144,667 | A | 11/2000 | Doshi et al. | 370/401 |
| 6,160,883 | A | 12/2000 | Jackson et al. | 379/230 |
| 6,173,279 | B1 | 1/2001 | Levin et al. | 707/5 |
| 6,175,858 | B1 | 1/2001 | Bulfer et al. | 709/206 |
| 6,185,535 | B1 * | 2/2001 | Hedin et al. | 704/270 |
| 6,192,110 | B1 | 2/2001 | Abella et al. | 379/88.01 |
| 6,192,338 | B1 | 2/2001 | Haszto et al. | 704/257 |
| 6,195,634 | B1 | 2/2001 | Dudemaine et al. | 704/231 |
| 6,195,651 | B1 | 2/2001 | Handel et al. | 707/2 |
| 6,208,972 | B1 * | 3/2001 | Grant et al. | 704/275 |
| 6,219,346 | B1 | 4/2001 | Maxemchuk | 370/338 |
| 6,219,643 | B1 | 4/2001 | Cohen et al. | 704/257 |
| 6,233,556 | B1 | 5/2001 | Teunen et al. | 704/250 |
| 6,233,559 | B1 * | 5/2001 | Balakrishnan | 704/275 |
| 6,246,981 | B1 | 6/2001 | Papineni et al. | 704/235 |
| 6,272,455 | B1 | 8/2001 | Hoshen et al. | 704/1 |
| 6,292,767 | B1 | 9/2001 | Jackson et al. | 704/1 |
| 6,314,402 | B1 | 11/2001 | Monaco et al. | 704/275 |
| 6,366,886 | B1 | 4/2002 | Dragosh et al. | 704/270.1 |
| 6,381,535 | B1 | 4/2002 | Durocher et al. | 701/202 |
| 6,385,646 | B1 | 5/2002 | Brown et al. | 709/217 |
| 6,393,428 | B1 | 5/2002 | Miller et al. | 707/102 |
| 6,404,878 | B1 | 6/2002 | Jackson et al. | 379/221.01 |
| 6,408,272 | B1 * | 6/2002 | White et al. | 704/270.1 |
| 6,411,810 | B1 | 6/2002 | Maxemchuk | 455/453 |
| 6,415,257 | B1 | 7/2002 | Junqua et al. | 704/275 |
| 6,418,210 | B1 | 7/2002 | Sayko | 379/142.15 |
| 6,420,975 | B1 * | 7/2002 | DeLine et al. | 340/815.4 |
| 6,430,285 | B1 | 8/2002 | Bauer et al. | 379/265.01 |
| 6,434,523 | B1 | 8/2002 | Monaco | 704/257 |
| 6,434,524 | B1 | 8/2002 | Weber | 704/257 |
| 6,442,522 | B1 | 8/2002 | Carberry et al. | 704/257 |
| 6,446,114 | B1 | 9/2002 | Bulfer et al. | 709/206 |
| 6,453,153 | B1 | 9/2002 | Bowker et al. | 455/67.4 |
| 6,453,292 | B2 | 9/2002 | Ramaswamy et al. | 704/235 |
| 6,456,711 | B1 | 9/2002 | Cheung et al. | 379/265.09 |
| 6,466,654 | B1 | 10/2002 | Cooper et al. | 379/88.01 |
| 6,466,899 | B1 | 10/2002 | Yano et al. | 704/1 |
| 6,498,797 | B1 | 12/2002 | Anerousis et al. | 370/522 |
| 6,499,013 | B1 | 12/2002 | Weber | 704/257 |
| 6,501,833 | B2 | 12/2002 | Phillips et al. | 379/88.07 |
| 6,501,834 | B1 | 12/2002 | Milewski et al. | 379/93.24 |
| 6,513,006 | B2 | 1/2003 | Howard et al. | 704/257 |
| 6,523,061 | B1 | 2/2003 | Halverson et al. | 709/202 |
| 6,532,444 | B1 | 3/2003 | Weber | 704/257 |
| 6,539,348 | B1 | 3/2003 | Bond et al. | 704/9 |
| 6,553,372 | B1 | 4/2003 | Brassell et al. | 707/5 |
| 6,556,970 | B1 | 4/2003 | Sasaki et al. | 704/257 |
| 6,556,973 | B1 | 4/2003 | Lewin | 704/277 |
| 6,560,576 | B1 | 5/2003 | Cohen et al. | 704/270 |
| 6,567,778 | B1 | 5/2003 | Chao Chang et al. | 704/257 |
| 6,567,797 | B1 | 5/2003 | Schuetze et al. | 707/2 |
| 6,570,555 | B1 | 5/2003 | Prevost et al. | 345/156 |
| 6,570,964 | B1 | 5/2003 | Murveit et al. | 379/67.1 |
| 6,574,597 | B1 | 6/2003 | Mohri et al. | 704/251 |
| 6,574,624 | B1 | 6/2003 | Johnson et al. | 707/5 |
| 6,594,257 | B1 | 7/2003 | Doshi et al. | 370/352 |
| 6,598,018 | B1 | 7/2003 | Junqua | 704/251 |
| 6,604,077 | B2 | 8/2003 | Dragosh et al. | 704/270.1 |
| 6,611,692 | B2 | 8/2003 | Raffel et al. | 455/552 |
| 6,614,773 | B1 | 9/2003 | Maxemchuk | 370/337 |
| 6,615,172 | B1 * | 9/2003 | Bennett et al. | 704/257 |
| 6,629,066 | B1 | 9/2003 | Jackson et al. | 704/9 |
| 6,631,346 | B1 | 10/2003 | Karaorman et al. | 704/9 |
| 6,643,620 | B1 | 11/2003 | Contolini et al. | 704/270 |
| 6,650,747 | B1 | 11/2003 | Bala et al. | 379/265.06 |
| 6,691,151 | B1 | 2/2004 | Cheyer et al. | 709/202 |
| 6,721,001 | B1 | 4/2004 | Berstis | 348/231.3 |
| 6,721,706 | B1 | 4/2004 | Strubbe et al. | 704/275 |
| 6,735,592 | B1 | 5/2004 | Neumann et al. | 707/101 |
| 6,741,931 | B1 * | 5/2004 | Kohut et al. | 701/209 |
| 6,742,021 | B1 * | 5/2004 | Halverson et al. | 709/218 |
| 6,757,718 | B1 | 6/2004 | Halverson et al. | 709/218 |
| 6,795,808 | B1 | 9/2004 | Strubbe et al. | 704/275 |
| 6,833,848 | B1 | 12/2004 | Wolff et al. | |
| 6,865,481 | B2 | 3/2005 | Kawazoe et al. | 701/211 |
| 6,877,134 | B1 | 4/2005 | Fuller et al. | |
| 6,901,366 | B1 | 5/2005 | Kuhn et al. | 704/275 |
| 6,937,977 | B2 * | 8/2005 | Gerson | 704/201 |
| 6,944,594 | B2 * | 9/2005 | Busayapongchai et al. | 704/275 |
| 6,973,387 | B2 | 12/2005 | Masclet et al. | 701/211 |
| 6,980,092 | B2 * | 12/2005 | Turnbull et al. | 340/425.5 |
| 6,990,513 | B2 | 1/2006 | Belfiore et al. | 709/203 |
| 6,996,531 | B2 | 2/2006 | Korall et al. | 704/270 |
| 7,020,609 | B2 | 3/2006 | Thrift et al. | 704/270.1 |

| | | | |
|---|---|---|---|
| 7,027,975 B1 | 4/2006 | Pazandak et al. | 704/9 |
| 7,062,488 B1 | 6/2006 | Reisman | 707/8 |
| 7,092,928 B1 | 8/2006 | Elad et al. | 706/60 |
| 7,127,400 B2 | 10/2006 | Koch | 704/270.1 |
| 7,137,126 B1 | 11/2006 | Coffman et al. | 719/328 |
| 7,146,319 B2 | 12/2006 | Hunt | 704/254 |
| 7,289,606 B2 | 10/2007 | Sibal et al. | 379/52 |
| 7,376,645 B2 | 5/2008 | Bernard | 707/3 |
| 7,398,209 B2 | 7/2008 | Kennewick et al. | 704/255 |
| 7,424,431 B2 | 9/2008 | Greene et al. | 704/270 |
| 7,461,059 B2 | 12/2008 | Richardson et al. | 707/5 |
| 7,493,559 B1 | 2/2009 | Wolff et al. | 715/727 |
| 2001/0041980 A1 | 11/2001 | Howard et al. | 704/270 |
| 2002/0049805 A1* | 4/2002 | Yamada et al. | 709/202 |
| 2002/0065568 A1 | 5/2002 | Silfvast et al. | 700/94 |
| 2002/0082911 A1 | 6/2002 | Dunn et al. | 705/14 |
| 2002/0120609 A1 | 8/2002 | Lang et al. | 707/1 |
| 2002/0124050 A1 | 9/2002 | Middeljans | 709/203 |
| 2002/0143535 A1 | 10/2002 | Kist et al. | 704/251 |
| 2002/0188602 A1 | 12/2002 | Stubler et al. | 707/3 |
| 2002/0198714 A1 | 12/2002 | Zhou | 704/252 |
| 2003/0014261 A1 | 1/2003 | Kageyama | 704/275 |
| 2003/0112267 A1 | 6/2003 | Belrose | 345/728 |
| 2003/0182132 A1* | 9/2003 | Niemoeller | 704/275 |
| 2004/0025115 A1 | 2/2004 | Sienel et al. | 715/513 |
| 2004/0044516 A1 | 3/2004 | Kennewick et al. | 704/5 |
| 2004/0166832 A1 | 8/2004 | Portman et al. | 455/412.1 |
| 2004/0199375 A1 | 10/2004 | Ehsani et al. | 704/4 |
| 2005/0021334 A1 | 1/2005 | Iwahashi | 704/240 |
| 2005/0021826 A1 | 1/2005 | Kumar | 709/232 |
| 2005/0033574 A1 | 2/2005 | Kim et al. | 704/251 |
| 2005/0114116 A1 | 5/2005 | Fiedler | 704/201 |
| 2005/0246174 A1 | 11/2005 | DeGolla | 704/270 |
| 2007/0033005 A1 | 2/2007 | Cristo et al. | 704/9 |
| 2007/0038436 A1 | 2/2007 | Cristo et al. | 704/9 |
| 2007/0050191 A1 | 3/2007 | Weider et al. | 704/275 |
| 2008/0091406 A1 | 4/2008 | Baldwin et al. | 704/4 |
| 2008/0103761 A1 | 5/2008 | Printz et al. | 704/9 |
| 2008/0115163 A1 | 5/2008 | Gilboa et al. | 725/34 |
| 2008/0133215 A1 | 6/2008 | Sarukkai | 704/2 |
| 2009/0117885 A1 | 5/2009 | Roth | 455/414.3 |
| 2009/0144271 A1 | 6/2009 | Richardson et al. | 707/5 |

OTHER PUBLICATIONS

Kuhn et al. "Hybrid in-car speech recognition for mobile multimedia applications", Vehicular Technology Conference, 1999, IEEE, Jul. 1999, pp. 2009-2013.*

Belvin et al. "Development of the HRL Route Navigation Dialogue System", Proceedings of the first international conference on Human language technology research, San Diego, 2001, pp. 1-5.*

Lind et al. "The network vehicle- A glimpse into the future of mobile multimedia," IEEE Aerosp. Electron. Syst. Mag., vol. 14, No. 9, Sep. 1999, pp. 27-32.*

Zhao, "Telematics: Safe and Fun Driving," IEEE Intelligent Systems, vol. 17, Issue 1, 2002, pp. 10-14.*

Elio et al, "On abstract task models and conversation policies," in Workshop on Specifying and Implementing Conversation Policies, Autonomous Agents '99, Seattle, 1999.*

Turunen; "Adaptive interaction methods in speech user interfaces", Conference on Human Factors in Computing Systems, Seattle, Washington, 2001, pp. 91-92.*

Reuters, "IBM to Enable Honda Drivers to Talk to Cars", Charles Schwab & Co., Inc., Jul. 28, 2002, 1 page.

Mao, Mark Z., "Automatic Training Set Segmentation for Multi-Pass Speech Recognition", Department of Electrical Engineering, Stanford University, CA, copyright 2005, IEEE, pp. I-685 to I-688.

VanHoucke, Vincent, "Confidence Scoring and Rejection Using Multi-Pass Speech Recognition", Nuance Communications, Menlo Park, CA, [no date], 4 pages.

Weng, Fuliang, et al., "Efficient Lattice Representation and Generation", Speech Technology and Research Laboratory, SRI International, Menlo Park, CA, [no date], 4 pages.

Chai et al., "MIND: A Semantics-Based Multimodal Interpretation Framework for Conversational System", *Proceedings of the International Class Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

* cited by examiner

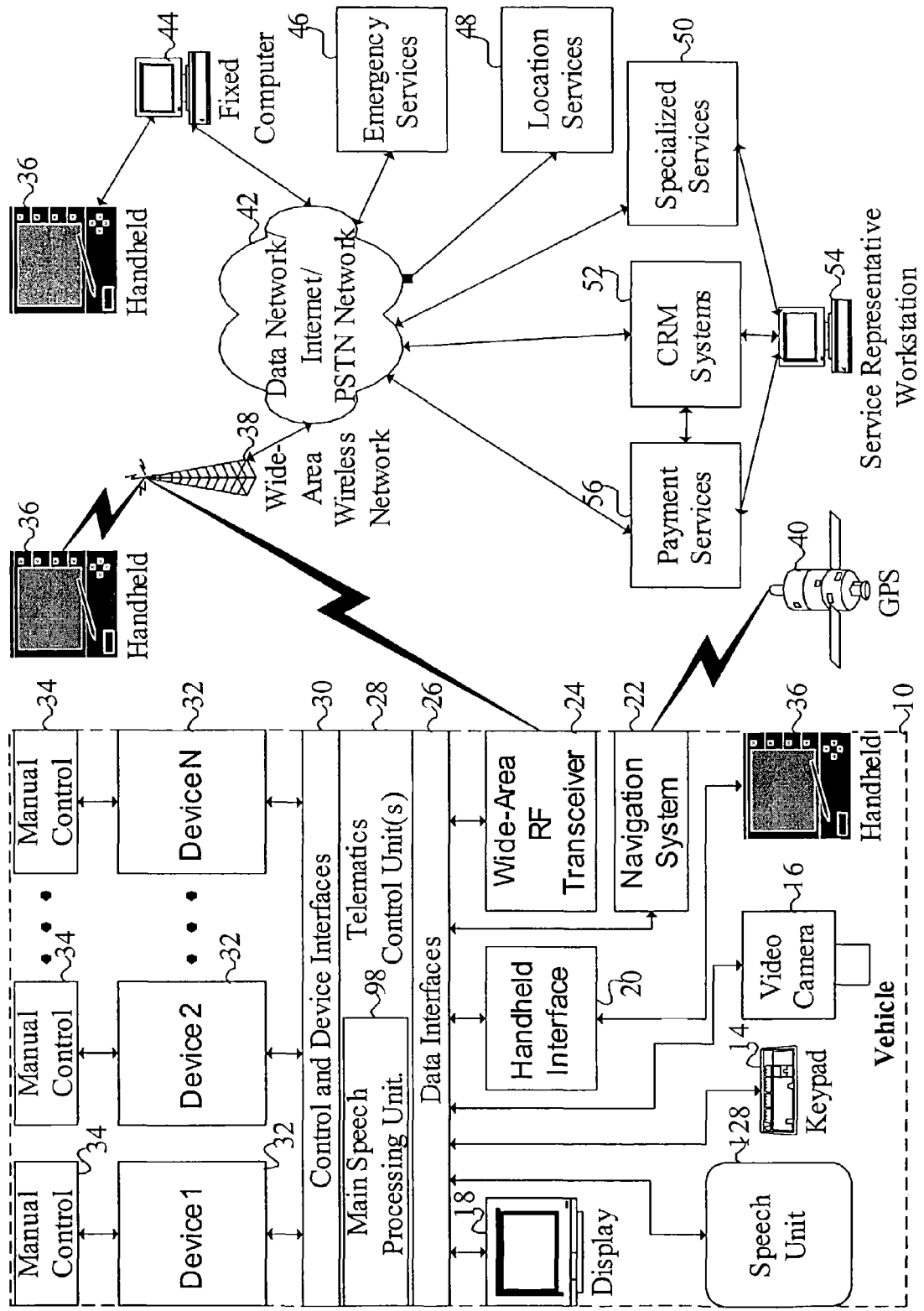
Figure 1. First Embodiment System Block Diagram

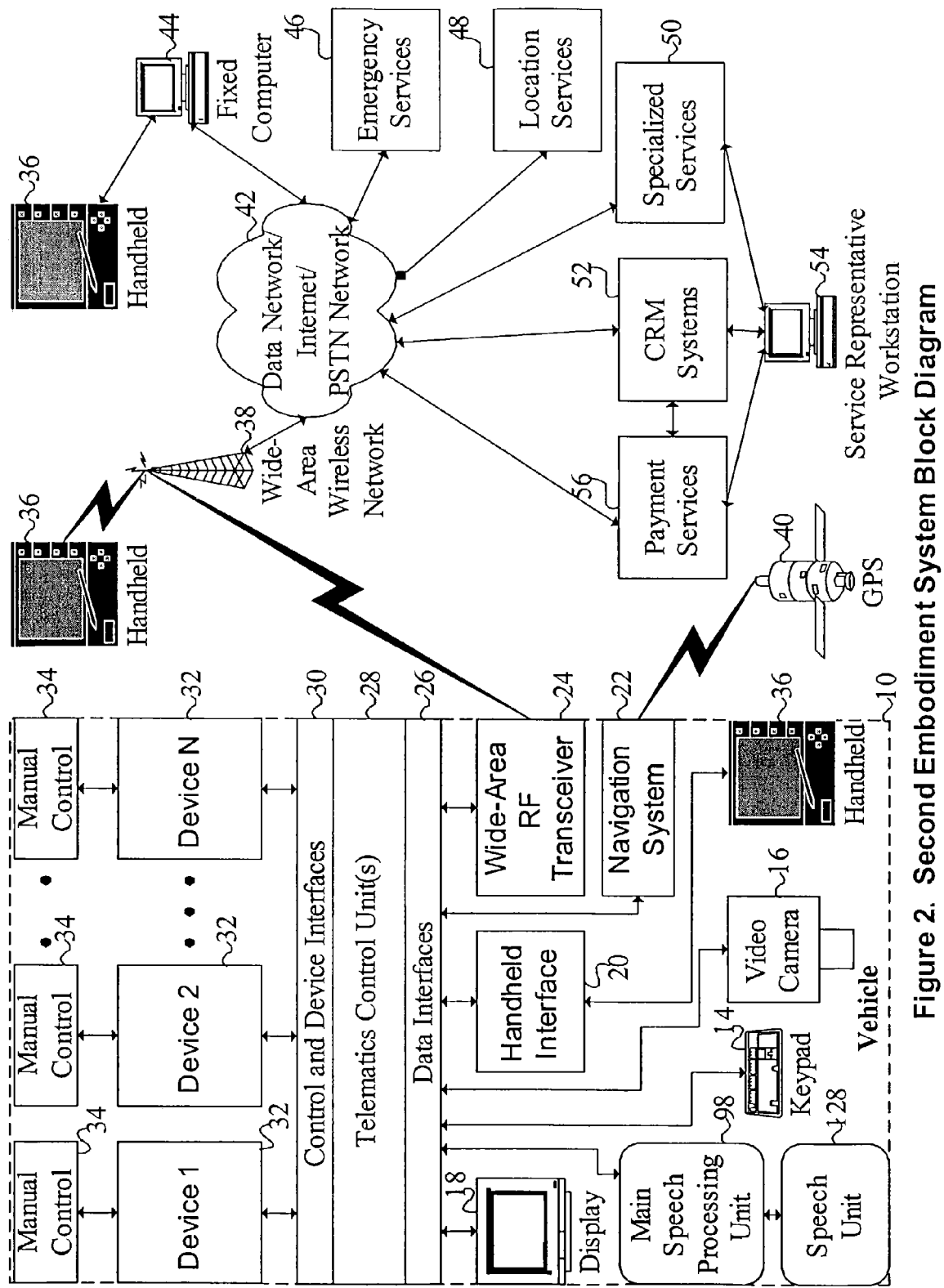
Figure 2. Second Embodiment System Block Diagram

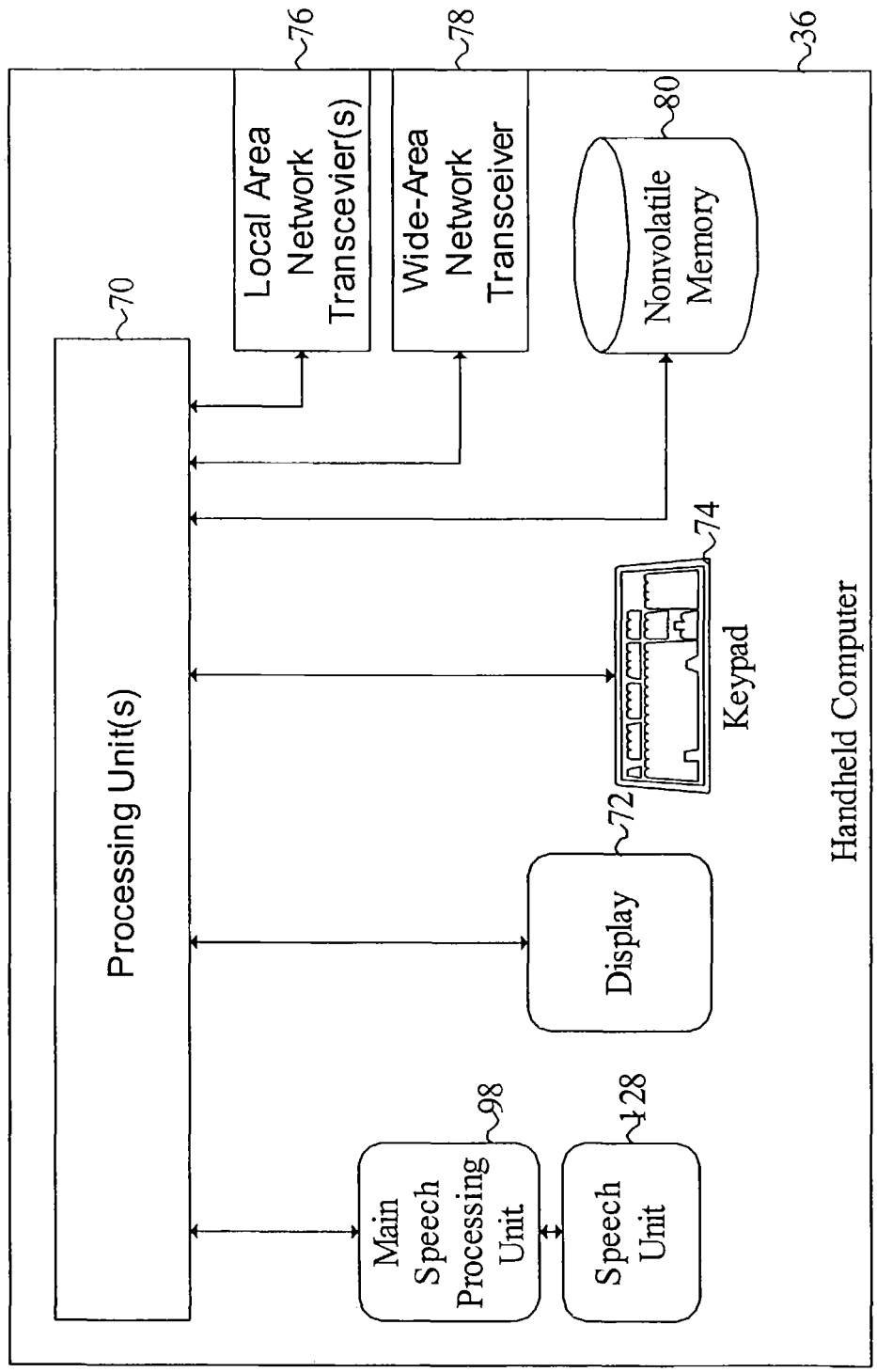
Figure 3. Handheld Computer Block Diagram.

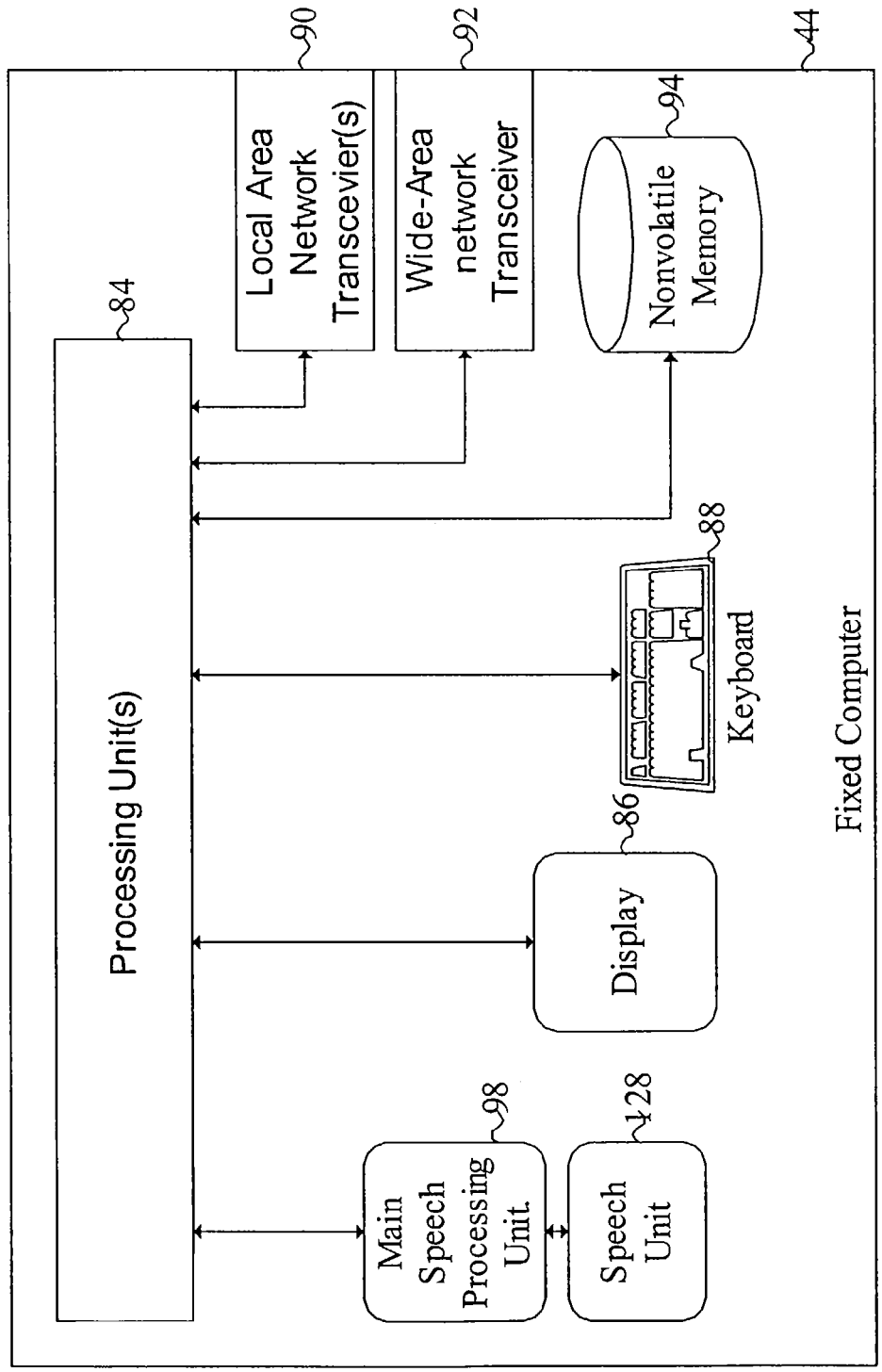
Figure 4. Fixed Computer Block Diagram.

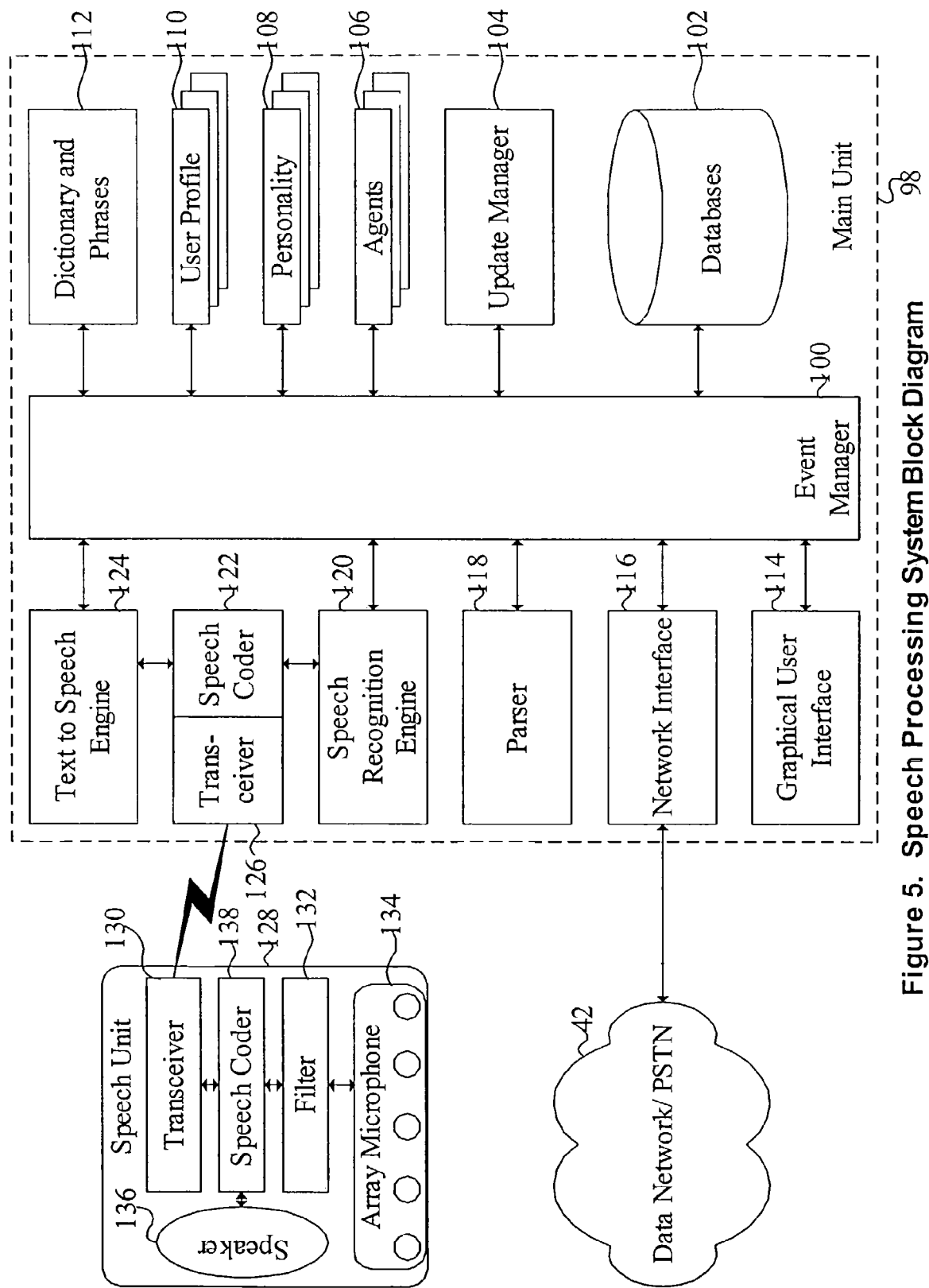
Figure 5. Speech Processing System Block Diagram

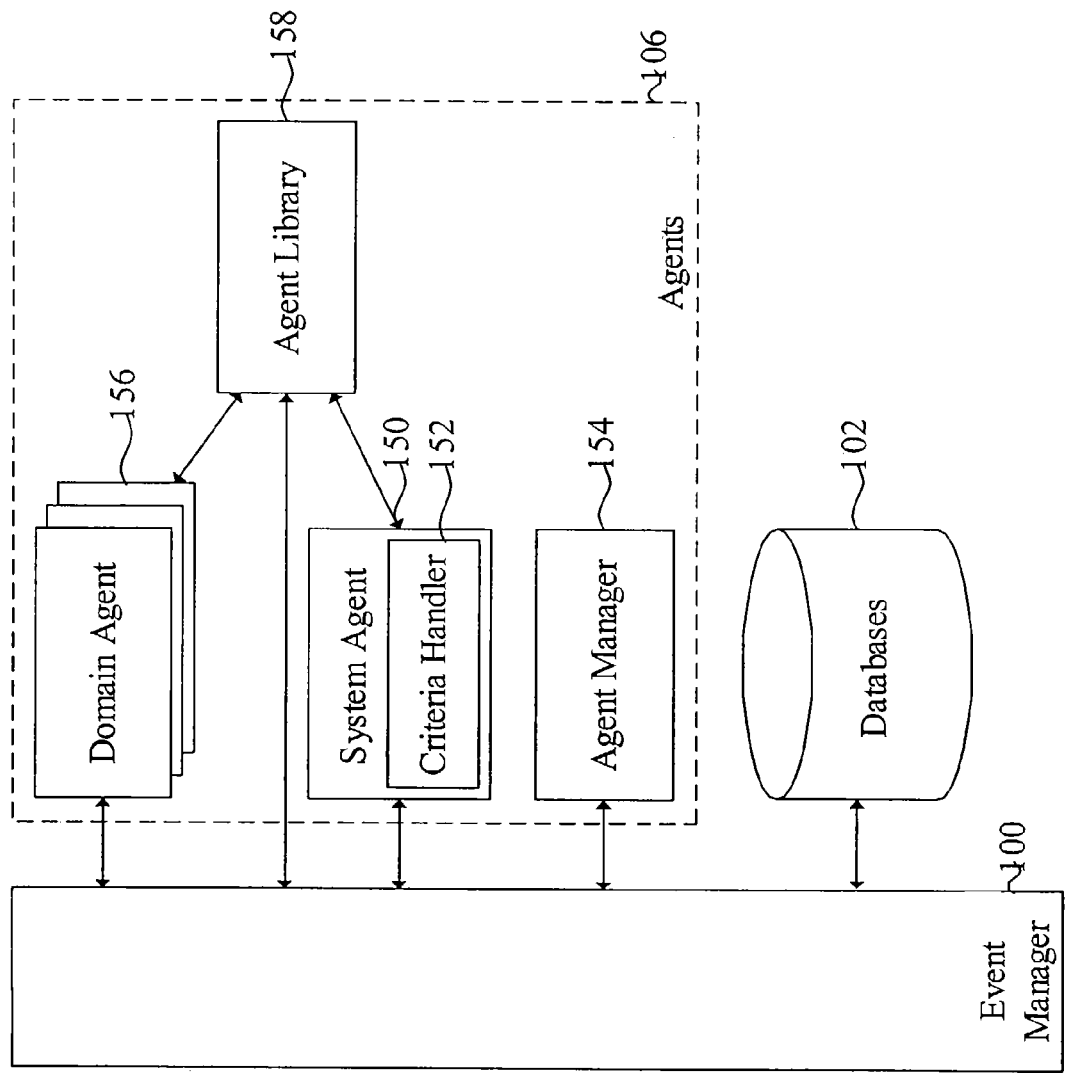
Figure 6. Agent Architecture

MOBILE SYSTEMS AND METHODS FOR RESPONDING TO NATURAL LANGUAGE SPEECH UTTERANCE

This application claims priority from U.S. Provisional Patent Application Ser. No. 60/395,615 filed Jul. 15, 2002, the disclosure of which is hereby incorporated by reference by its entirety.

FIELD OF THE INVENTION

The present invention relates to the retrieval of online information and processing of commands through a speech interface in a vehicle environment. More specifically, the invention is a fully integrated environment allowing mobile users to ask natural language speech questions or give natural language commands in a wide range of domains, supporting local or remote commands, making local and network queries to obtain information, and presenting results in a natural manner even in cases where the question asked or the responses received are incomplete, ambiguous or subjective.

BACKGROUND OF THE INVENTION

Telematics systems are systems that bring human-computer interfaces to vehicular environments. Conventional computer interfaces use some combination of keyboards, keypads, point and click techniques and touch screen displays. These conventional interface techniques are generally not suitable for a vehicular environment, owing to the speed of interaction and the inherent danger and distraction. Therefore, speech interfaces are being adopted in many telematics applications.

However, creating a natural language speech interface that is suitable for use in the vehicular environment has proved difficult. A general-purpose telematics system must accommodate commands and queries from a wide range of domains and from many users with diverse preferences and needs. Further, multiple vehicle occupants may want to use such systems, often simultaneously. Finally, most vehicle environments are relatively noisy, making accurate speech recognition inherently difficult.

Human retrieval of both local and network hosted online information and processing of commands in a natural manner remains a difficult problem in any environment, especially onboard vehicles. Cognitive research on human interaction shows that a person asking a question or giving a command typically relies heavily on context and the domain knowledge of the person answering. On the other hand, machine-based queries of documents and databases and execution of commands must be highly structured and are not inherently natural to the human user. Thus, human questions and commands and machine processing of queries are fundamentally incompatible. Yet the ability to allow a person to make natural language speech-based queries remains a desirable goal.

Much work covering multiple methods has been done in the fields of natural language processing and speech recognition. Speech recognition has steadily improved in accuracy and today is successfully used in a wide range of applications. Natural language processing has previously been applied to the parsing of speech queries. Yet, no system developed provides a complete environment for users to make natural language speech queries or commands and receive natural sounding responses in a vehicular environment. There remain a number of significant barriers to creation of a complete natural language speech-based query and response environment.

The fact that most natural language queries and commands are incomplete in their definition is a significant barrier to natural human query-response interaction. Further, some questions can only be interpreted in the context of previous questions, knowledge of the domain, or the user's history of interests and preferences. Thus, some natural language questions and commands may not be easily transformed to machine processable form. Compounding this problem, many natural language questions may be ambiguous or subjective. In these cases, the formation of a machine processable query and returning of a natural language response is difficult at best.

Even once a question is asked, parsed and interpreted machine processable queries and commands must be formulated. Depending on the nature of the question, there may not be a simple set of queries returning an adequate response. Several queries may need to be initiated and even these queries may need to be chained or concatenated, to achieve a complete result. Further, no single available source may include the entire set of results required. Thus multiple queries, perhaps with several parts, need to be made to multiple data sources, which can be both local or on a network. Not all of these sources and queries will return useful results or any results at all. In a mobile or vehicular environment, the use of wireless communications compounds the chances that queries will not complete or return useful results. Useful results that are returned are often embedded in other information, and from which they may need to be extracted. For example, a few key words or numbers often need to be "scraped" from a larger amount of other information in a text string, table, list, page or other information. At the same time, other extraneous information such as graphics or pictures needs to be removed to process the response in speech. In any case, the multiple results must be evaluated and combined to form the best possible answer, even in the case where some queries do not return useful results or fail entirely. In cases where the question is ambiguous or the result inherently subjective, determining the best result to present is a complex process. Finally, to maintain a natural interaction, responses need to be returned rapidly to the user. Managing and evaluating complex and uncertain queries while maintaining real-time performance is a significant challenge.

These and other drawbacks exist in existing systems.

SUMMARY OF THE INVENTION

An object of the invention is to overcome these and other drawbacks of prior speech-based telematic systems.

According to one aspect of the invention, systems and methods are provided that may overcome deficiencies of prior systems through the application of a complete speech-based information query, retrieval, presentation and command environment. This environment makes significant use of context, prior information, domain knowledge, and user specific profile data to achieve a natural environment for one or more users making queries or commands in multiple domains. Through this integrated approach, a speech-based natural language query, response and command environment is created. Further, at each step in the process, accommodation may be made for full or partial failure and graceful recovery. The robustness to partial failure is achieved through the use of probabilistic and fuzzy reasoning at several stages of the process. This robustness to partial failure promotes the feeling of a natural response to questions and commands.

According to another aspect of the invention, a mobile interactive natural language speech system (herein "the system") is provided that includes a speech unit. The speech unit may be incorporated into a vehicle computer device or system, or may be a separate device. If a separate device, the speech unit may be connected to the vehicle computer device via a wired or wireless connection. In some embodiments, the interactive natural language speech device can be handheld. The handheld device may interface with vehicle computers or other electronic control systems through wired or wireless links. The handheld device can also operate independently of the vehicle. The handheld device can be used to remotely control the vehicle through a wireless local area connection, a wide area wireless connection or through other communication links.

According to another aspect of the invention, the system may include a stand alone or networked PC attached to a vehicle, a standalone or networked fixed computer in a home or office, a PDA, wireless phone, or other portable computer device, or other computer device or system. For convenience, these and other computer alternatives shall be simply referred to as a computer. One aspect of the invention includes software that is installed onto the computer, where the software includes one or more of the following modules: a speech recognition module for capturing the user input; a parser for parsing the input, a text to speech engine module for converting text to speech; a network interface for enabling the computer to interface with one or more networks; a graphical user interface module, an event manager for managing events and other modules. In some embodiments the event manager is in communication with a dictionary and phrases module, a user profile module that enables user profiles to be created, modified and accessed, a personality module that enables various personalities to be created and used, an agent module, an update manager and one or more databases. It will be understood that this software can be distributed in any way between a handheld device, a computer attached to a vehicle, a desktop computer or a server without altering the function, features, scope, or intent of the invention.

According to one aspect of the invention, and regardless of the distribution of the functionality, the system may include a speech interface device that receives spoken natural language queries, commands and/or other utterances from a user, and a computer device or system that receives input from the speech unit and processes the input (e.g., retrieves information responsive to the query, takes action consistent with the command and performs other functions as detailed herein), and responds to the user with a natural language speech response.

According to another aspect of invention, the system can be interfaced by wired or wireless connections to one or more vehicle-related systems. These vehicle-related systems can themselves be distributed between electronic controls or computers attached to the vehicle or external to the vehicle. Vehicle systems employed can include, electronic control systems, entertainment devices, navigation equipment, and measurement equipment or sensors. External systems employed include those used during vehicle operation, such as, weight sensors, payment systems, emergency assistance networks, remote ordering systems, and automated or attended customer service functions. Systems on the vehicle typically communicate with external systems via wireless communications networks.

According to another aspect of the invention, the system can be deployed in a network of devices using common base of agents, data, information, user profiles and histories. Each user can then interact with, and receive the same services and applications at any location equipped with the required device on the network. For example, multiple devices on which the invention is deployed, and connected to a network, can be placed at different locations throughout a home, place of business, vehicle or other location. In such a case, the system can use the location of the particular device addressed by the user as part of the context for the questions asked.

According to some aspects of the invention, domain specific behavior and information are organized into agents. Agents are executables that receive, process and respond to user questions, queries and commands. The agents provide convenient and re-distributable packages or modules of functionality, typically for a specific domain. Agents can be packages of executable code, scripts, links to information, data, and other data forms, required to provide a specific/package of functionality, usually in a specific domain. In other words, an agent may include everything that is needed to extend the functionality of the invention to a new domain. Further, agents and their associated data can be updated remotely over a network as new behavior is added or new information becomes available. Agents can use system resources and the services of other, typically more specialized, agents. Agents can be distributed and redistributed in a number of ways including on removable storage media, transfer over networks or attached to emails and other messages. An update manger is used to add new agents to the system or update existing agents.

The software behavior and data in an agent can either be of a general-purpose nature or specific to a domain or area of functionality. One or more system agents include general-purpose behaviors and data, which provide core or foundation services for more specialized domain or system agents. Examples of general-purpose functionality include transmitting and receiving information over data networks, parsing text strings, general commands to the interactive natural language telematics speech interface, and other functions. For example, a specific system agent may be used to transmit and receive information over a particular type of network, and may use the services of a more general network agent. Domain specific agents include the behavior and data required for a specific area of functionality. More specialized domain agents can use the functionality of more generalized domain agents. Areas of functionality or specific domains are broadly divided into two categories, query and response, and control. Examples of query and response domains include driving directions, travel services, entertainment scheduling, and other information, Agents may in, turn query other agents. For example, a fast food ordering agent, may use the services of a restaurant ordering agent and payment agent, which may in turn, use the services of location agent and a travel services agent. Control domains include control of specific devices on a vehicle. In each case, the agent includes or has access to the data and functionality required to control the device through the appropriate interfaces. For example, a specific domain agent may be used to control the windshield wipers on a vehicle. In another example, a domain agent for controlling the vehicle's headlights may use the services of a lighting control agent, which may use the services of an electrical device control agent. Some domains, and therefore agents, may combine aspects of control with query and response functionality. For example, a user may wish to listen to a particular piece of music. In this case, the domain agent will make one or more queries, possibly using the services of other agents, to locate a source for the music and retrieve it. Next, the domain agent will activate a suitable player for the format of the music, again possibly using the services of other agents.

The invention may provide license management capability allowing the sale of agents by third parties to one or more users on a one time or subscription basis. In addition, users with particular expertise can create agents, update existing agents by adding new behaviors and information and making these agents to other users.

Given the desire for domain specific behavior, user specific behavior and domain specific information, the invention may allow both users and content providers to extend the system capabilities, add data to local data sources, and add references to network data sources. To allow coverage of the widest possible range of topics and support for the widest range of devices, the system may allow third party content developers to develop, distribute and sell specialized or domain specific system programs and information. Content is created though creation of new agents, scripting existing agents, adding new data to agents or databases, and adding or modifying Links to information sources. Distribution of this information is sensitive to the user's interests and use history and to their willingness to pay for it.

According to another aspect of the invention, the system may include mechanisms to allow users themselves to post and distribute agents and information in their particular areas of expertise, to improved system capability. Further, users can extend the system and configure it to their own preferences, add information to their profile to define new questions or queries, extend and modify existing questions and queries, add new data sources, update data sources, set preferences and specify presentation parameters for results.

According to one aspect of the invention, the system can be distributed between any combination of vehicle computers, handheld devices, server computers, desktop computers and other terminal devices. Each of these devices may have a local set of databases and agents, which may be specific to a user or users. If a given user is to see a uniform set of capability across the various platforms, the databases and agents can be synchronized. The synchronization of data and agents can be automatically or manually initiated. For example, changes to agents and databases can be automatically propagated to other platforms used by that user whenever and wherever network connections permit. In another example, changes on a handheld computer are propagated to a vehicle computer or vice versa when the handheld is connected to the vehicle computer on a wireless or wired link. Alternatively, a user may wish to block the synchronization of sensitive or personal information to certain platforms used by the user. For example, a user may choose to keep all of their personal and other sensitive information on their handheld device and use the computing power, databases and network connections of other platforms from their handheld device. In a further example, a vehicle operator can carry their personal databases and agents from one vehicle to another, but keep their information within the handheld computer.

To further enhance the natural query and response environment, the system may format results in a manner enhancing the understandability to the user. The optimal formatting and presentation depends on the context of the queries, the contents of the response being presented, the history of the interaction with the user, the user's preferences and interests and the nature of the domain.

Information presented in a rigid, highly formatted, or structured manner seems unnatural to most people. Thus the system may simulate some aspects of human "personality." In some embodiments, the presentation of the response and the terms used are randomized so they do not appear rigidly formatted or mechanical. The use of simulated personality characteristics is also desirable. For example, a response that may be upsetting to the user is best presented in a sympathetic manner. In another example, information requiring immediate action or annunciating a safety problem can be delivered with a definite and authoritative personality.

The results of queries may be long text strings, lists, tables or other lengthy sets of data. Natural presentation of this type of information presents particular challenges. Simply reading the long response is generally not preferred. Therefore the system can parse the most important sections from the response and, at least initially, only report these. Determining what parts of a long response are presented may depend on the context of the questions, the contents of the response being presented, the history of the interaction with the user, the user's preferences and interests and the nature of the domain. At the same time, the system may give the user, interactive control over what information and how much information is being presented, to stop the response all together, or to take other actions.

The invention can be applied as a user interface to telematics systems in a wide variety of environments. These environments can include, but are not limited to, the following: 1) personal automobiles, rented automobiles, or fleet automobiles; 2) motorcycles, scooters, and other two wheeled or open-air vehicles; 3)commercial long-haul and short haul trucks; 4) delivery service vehicles; 5)) fleet service vehicles; 6) industrial vehicles; 7) agricultural and construction machinery; 8) water-borne vehicles; 9) aircraft; and; 10) specialized military, law enforcement and emergency vehicles.

The system, according to one aspect of the invention, can process and respond to questions, queries and commands. Keywords or context can be used to determine if the user's utterance is a command or query. Some utterances can include both aspects of a command and a query or question. For example, a user may say, "tune in my favorite radio station." A query may be required to determine the name, and/or the channel of the use's favorite station. If the programming on that station is of a type the user generally does not listen to, the system can suggest using an alterative, such as listening to a CD more likely to please the user.

The invention can be used for generalized local or network information query, retrieval and presentation in a mobile environment. For each user utterance including a question or query or set of questions or queries, the system may perform multiple steps possibly including: 1) capturing the user's question or query through accurate speech recognition operating in a variety of real-world environments; 2) parsing and interpreting the question or query; 3) determining the domain of expertise required and context, invoking the proper resources, including agents; 4) formulating one or more queries to one or more local and/or network data sources or sending appropriate commands to local or remote devices or the system itself, 5) performing required formatting, variable substitutions and transformations to modify the queries to a form most likely to yield desired results from the available sources; 6) executing the multiple queries or commands in an asynchronous manner and dealing gracefully with failures; 7) extracting or scraping the desired information from the one or more results, which may be returned in any one of a number of different formats; 8) evaluating and interpreting the results, including processing of errors, gathered and combine them into a single best result judged to be "best" even if the results are ambiguous, incomplete, or conflicting; 9) performing required formatting, variable substitutions and transformations to modify the results to a form most easily understood by the user; and, 10) presenting the compound result, through a text to speech engine, to the user in a useful and expected manner.

The above steps may be performed using the context of the domain of expertise required, the context for the question or command, domain specific information, the history of the user's interaction, user preferences, information sources or commands available, and responses obtained from the sources. At each stage probabilistic or fuzzy set decision and matching methods can be applied to deal with inconsistent, ambiguous, conflicting and incomplete information or responses. In addition the use of asynchronous queries, allowing rapid and graceful failure of some queries or commands, allows the system to robustly return results quickly, and in a manner that seems natural to the user.

Many everyday questions are inherently subjective and result in answers that are a matter of option or consensus as much as fact. Such questions are often ad hoc in their nature, as well. The invention may use probabilistic and fuzzy set decision and matching methods to first identify the subjective nature of the question and to evaluate a range of possible answers, selecting the one answer or few answers that best represent the type of result desired by the user.

The context and expected results from a particular question may be highly dependent on the individual asking the question. Therefore, the invention creates, stores and uses extensive personal profile information for each user. Information in the profile may be added and updated automatically as the user uses the system or can be manually added or updated by the user. Domain specific agents collect, store and use specific profile information, as required for optimal operations. Users can create commands for regularly used reports, automatically generated alerts, and other queries and for the formatting and presentation of results. The system may use profile data in interpreting questions, formulating queries, interpreting results of queries and presenting answers to the user. Examples of information in a user profile includes, history of questions asked, session histories, formatting and presentation preferences, vehicle type, special vehicle equipment, vehicle related data, special word spelling, terms of interest, special data sources of interest, age, sex, education level, location of vehicle, planned path or route, specific addresses, commonly visited destinations, place of business, type of business, investments, hobbies, sports interests, news interests and other profile data.

To create a natural question and response environment, the invention can attempt to provide rapid responses without requiring any additional information. The invention may determine the mostly likely context or domain for a user's question or command, for example, by using a real-time scoring system or other techniques. Based on this determination the system can invoke the correct agent. The agent may make one or more queries and may rapidly return a formatted response. Thus, a user can receive a direct response to a set of questions each with a different response or context. In some cases, the available information, including the query results, may not adequately answer the question. The user can then be asked one or more questions to resolve the ambiguity. Additional queries may then be made before an adequate response is made. In these cases, the system can use context information, user profile information and domain specific information to minimize the interaction with the user required to deliver a response.

If the confidence level of the domain or context score is not high enough to ensure a reliable response, the system can ask a question of the user to verify the question or command is correctly understood. In general the question may be phrased to indicate the context of the question including all criteria or parameters. If the user confirms that the question is correct then the system may proceed to produce a response. Otherwise, either the user can rephrase the original question, perhaps adding additional information to remove ambiguity, or the system can ask one or more questions to attempt to resolve the ambiguity or other actions may taken.

While the invention is intended to be able to accept most any natural language question or command, ambiguity can still be a problem. To assist users formulate concise questions and commands, the system can support a voice query language. The language helps users clearly specify the keywords or contexts of the question or command along with the parameters or criteria. The system may provide built in training capabilities to help the user learn the best methods to formulate their questions and commands.

To make the responses to user's questions and commands seem more natural, the invention may employ one or more dynamically invokeable personalities. Personalities have specific characteristics, which simulate the behavioral characteristics of real humans. Examples of these characteristics include, sympathy, irritation, and helpfulness. The personality also randomizes aspects of responses, just as a real human would do. This behavior includes randomization of terms used and the order of presentation of information. Characteristics of the personality may be invoked using probabilistic or fuzzy set decision and matching methods, and using criteria including the context for the question, the history of the user's interaction, user preferences, information sources available, responses obtained from the sources.

The invention may use special procedures to present information that is in the form of long text strings, tables, lists or other long response sets. Simply presenting a long set of information in an ordered manner may not be natural nor what most users have in mind. The system, using probabilistic or fuzzy set matching methods, may extract the most relevant information to the user and presents these subsets first. Further the system can provide commands allowing the user to skip through the list, find keywords or key information in the list or stop processing the list altogether.

Multiple users can use the system at different times or during interleaved or overlapping sessions. The system may recognizes a user either by name or voice. Once the user is recognized, the system may invoke the correct profile. If multiple users are addressing the system in overlapping or interleaved sessions, the system can determine which user is stating each question or command and apply the correct profile and context. For applications requiring security, the user is verified, typically by using voiceprint matching or requesting a password or pass-phrase from the user. When multiple users are engaged in interleaved sessions, the system may gracefully resolve conflicts using a probabilistic or fuzzy set decision method. This process simulates the manner in which a human would address multiple questions. For example, the system may answer short questions first at times, while answering questions in the order received at other times.

Since the system may operate in noisy environments, typical of vehicles, including environments with background noise, point noise sources and people holding conversations, filtering of speech input may be advantageous. The system can use either one-dimensional or two-dimensional array microphones (or other devices) to receive human speech. The array microphones can be fixed or employ dynamic beam forming techniques. The array pattern may be adjusted to maximize gain in the direction of the user and to null point noise sources. Alternatively, microphones can be placed at particular locations within a vehicle near where occupants are likely to use the system. These microphones can be single microphones, directional microphones or an array of microphones. Speech received at the microphones may then be processed with analog or digital filters to optimize the bandwidth, cancel echoes, and notch-out narrow band noise sources. Following filtering, the system may use variable rate sampling to maximize the fidelity of the encoded speech, while minimizing required bandwidth. This procedure can be particularly useful in cases where the encoded speech is transmitted over a wireless network or link.

The invention can be applied to a wide range of telematics applications. General applications areas can include, but are not limited to remote or local vehicle control, information query, retrieval and presentation from local or network sources, safety applications, and security applications.

The system can provide local or remote control functions for the system or for other devices on the vehicle or off the vehicle. Users can initiate commands locally or remotely. Typically, remote operation may be through a telephone or other audio connection. Alternately, the user can address spoken commands to a handheld device or desktop unit, which may send the commands to controllers on the vehicle over wireless links. Other remote command techniques may be used. The system may process commands in a nearly identical manner to a query. One difference being that the result of the command is generally an action rather than a response. In many cases, the system may give the user a cue or response to indicate that the command has been successfully executed or has failed. In cases of failure, an interactive session may be started to allow the user to resolve the difficulty or formulate a command more likely to succeed.

For each user command utterance, the system may execute a number of steps possibly including: 1) capture the user's command through accurate speech recognition operating in a variety of real-world environments; 2) parse and interpret the command; 3) determine the domain for the command and context, invoking the proper resources, including agents as required; 4) gather required data including, device settings, and measurement data; 5)) formulate device specific commands for the system or external devices; 6) route command to system, or external devices, including external devices connected to data networks; 7) receive and process results of command, including errors; and, 8) optionally, provide response to user indicating the success or failure of the command, and possibly including state information.

The invention can provide to users, including vehicle operators, the capability to control most any vehicle system function using interactive speech. Generally, all controls of a critical nature or with safety implications may employ fail-safe checks, verify that a command will not create a hazardous condition before it is executed and have manual overrides. The invention can provide built in help and user guidance for the devices under control. This guidance can include step-by-step training for operators learning to use the features of the vehicle. The system can provide extensive interactive guidance when commands cannot be executed or fail. This advice can include, suggestions to reformulate the command so it can succeed, suggestions to work around a failure, and suggestions for alternative commands that may achieve a similar function. Examples of control functions, which can be performed from local or remote locations by the invention include:

1. Control of vehicle multimedia entertainment electronics, such as radio, CD player, or video player. This control can be based on user specified play lists and is sensitive to the users profile information including, preferences and history. The invention includes the capability to control multiple or individual multimedia entertainment stations.
2. Control of communications devices such as cell phones, voice mail, fax systems, text or instant messaging systems, call and message forwarding capabilities, email systems and other communication devices. This control includes features including, address books, phone books, call forwarding, conference calling, and voice mail, among others.
3. Local or remote control of vehicle systems. Most any device on the vehicle can be under control and can include, door locks, window controls, interior temperature controls, shifting of the transmission, turn signals, lights, safety equipment, engine ignition, cruse control, fuel tank switches, seat adjustments, specialize equipment such as winches, lifting systems or loading systems, and other vehicle systems.
4. Control of systems external to the vehicle typically through wireless links and including, garage door openers, gate controllers, vehicle entry security passes, automated toll collection systems, and vehicle weighing systems and other external systems.
5. Vehicle power management and systems control. The invention can provide the vehicle operator with information on limitations and on tips for better power management or fuel utilization or other systems control.
6. Diagnostic information management. The invention can provide diagnostic information announcements and warnings for the vehicle operator. These announcements and warnings are interactive allowing the operator to request additional information, or a suggested course of action. The invention can mediate a solution to the problem, including scheduling service, summoning help or providing instructions for remedial action until a permanent solution can be achieved. The system can ask the operator to authorize ordering likely needed parts, and provide cost estimates. The system can receive data for these announcements and warnings from a wide range of sources including sensors and vehicle control computers; Sensors can include fuel level sensors, coolant temperature sensors, oil temperature sensors, axel temperature sensors, tire pressure sensors, etc.
7. System status inquiry. Vehicle operators can use the interactive natural language interface of the invention to query and receive reports of the status of systems on the vehicle including, fuel level, interior temperature, outside temperature, engine or other vehicle systems. The operator can further query the system to receive more information or determine a course of action if problem is detected.
8. Vehicle service history. The invention can provide the vehicle operator or other personnel with interactive access to the vehicle service history. The invention can provide announcements or warnings as the time for service draws near. The user can interact with the system to schedule the required service, order required parts, receive cost estimates, or update the service history. Users can customize the nature of this interaction to suite their desires or policies.
9. Diagnostic and service history. The invention can provide diagnostic and service history information to service personnel. This information can include vehicle fault codes and other information on devices under control of or measured by the system. Alternatively, the invention can receive information on the state and history of vehicle operation from other control computers. The invention can provide interactive service information and history. The service history can be queried and added to using the speech interface. The system can prompt service personnel for more information if the record is deemed incomplete. In other cases the invention can prompt service personnel for information on their actions if a change in system status, such as replacement of a part is detected.

The invention can provide users or operators of a vehicle with specialized safety functions through the interactive speech interface. The invention uses a dynamically evocable personality capability to create announcements that are appropriate for the severity of the situation. The announcements and personalities can be under user control and configuration. Some examples of these safety applications can include:

1. The invention can provide automated detection and reporting of accident situations through the wireless communications link. Information on an accident situation can be gathered form airbag control systems or other sensors. Once an accident situation has been detected the invention uses the interactive speech interface to determine nature of accident and condition of victims. This information, along with location information, can then be reported over the wireless link. Alternatively, the invention can establish a voice channel communications between occupants of the vehicle and emergency personnel.
2. The invention can be used to store and retrieve medical information on vehicle occupants. Following an accident, emergency personnel can query the system for this information. Alternatively, the system can annunciate a warning to emergency personnel if a person has a special medical condition. The system maintains the security of medical information through a number of techniques, including not annunciating medical information unless an accident is detected, or not annunciating medical information unless that person or another authorized person gives permission.
3. Occupants of the vehicle can summon help in the event of a crime using the speech interface of the invention. Typical crimes include robberies and hijackings. The invention allows vehicle occupants to set panic or emergency words or phrases that indicate to the system a crime is occurring.
4. The invention can provide the vehicle operator with safety announcements if an unsafe or potentially unsafe situation is detected. The operator can use the interactive speech interface to obtain more information on the situation or dismiss the alert. The operator can annunciate commands to remedy or mitigate the situation during this dialog. Conditions that can be announced include, following another vehicle too closely, too great a speed for the road or conditions, obstruction on roadway, a fire in some part of the vehicle, high cargo pressure or temperature, leaks, and other information.
5. The interactive speech interface of the invention can provide the operator with real-time assistance. This assistance can include, aid parking or backing, aid with complex maneuvers, aid with optimal operation of the vehicle, etc. The operator can ask the system for advice or assistance with a planned maneuver or operation. Alternatively, the invention can proactively offer assistance if certain situations are detected.
6. The interactive speech interface of the invention can be used to improve vehicle security. Voiceprints or voice authentication can be used to gain access to the vehicle or start the vehicle. Alternatively or in addition, a password or pass-phrase can be used. In another alternative speech security can be used as a supplement to other vehicle security techniques.
7. The invention can provide measurement of operator fatigue and alert the operator or remote personnel if unacceptable levels of fatigue are detected. The interactive speech interface can be used to query the operator to detect fatigue. Alternatively, or in addition, other measurements of operator fatigue can be used. If a fatigue situation is detected the invention may initiate a dialog with the operator to determine the extent of the problem and if required, ask the operator to cease operation.

The invention can offer vehicle operators and occupants a variety of services, useful while in the vehicle or arriving at a destination. For any of these applications, the user can employ the interactive speech interface of the invention. Further, users can employ the interactive natural language speech interface to customize these services to suite each individual. Some examples of services that can be supported by the natural-language interactive speech interface of the invention, include:

1. The invention can provide vehicle operators interactive directions to a destination or waypoint. The user can specify a desired destination and any preferred waypoints. A destination can be specified in any manner including, the name of a place, an address, name of a person, name of a business, or type of business. As the trip progresses the system may provide the operator with continued directions and warnings if a mistake has been made. The operator can query the system for additional information, or less information as required. Generally, the system is interfaced with one or more navigation sensors and local or remote map databases. The invention provides can provide operators or passengers with alerts of upcoming points or interest, required exits or stops, hazards, etc. The users can query the system for more specific information. Alternatively, the invention can provide operators and occupants of the vehicle an interactive guided tour. The system's information query, retrieval and presentation capability can be employed by users to receive additional information or points or items of interest during the tour and may take into account stored personal profile information for a user.
2. The invention can provide the operator of a vehicle with interactive dynamic routing information. The routing can be updated based on traffic conditions, weather conditions, facilities availability, and information provided by the operator. Generally, the system is interfaced with one or more navigation sensors, local or remote map databases, and sources of traffic, weather, and facilities use data.
3. The direction, routing and communications capabilities of the invention can be combined in an Interactive system which helps one or more operator rendezvous at a predetermined destination or any other convenient midpoint. The operators used the interactive natural language interface to communicate with the system to arrange the rendezvous, receive directions as they travel to the rendezvous point and to communicate with the other operators.
4. The navigational capabilities of the invention can be used to place limits on where a vehicle is allowed to go or for how long. The system employs the interactive natural language speech interface to inform the operator when the vehicle is approaching or has exceeded a limit. The operator can query the system to determine the best course of action to return to limits or prevent exceeding them. Alternatively, the system can query the operator to determine why they are exceeding the limits or to mediate a negotiation to extend the limits if this is required by circumstances. This capability is useful in several situations including, keeping a delivery or passenger vehicle on a regular route, setting and enforcing use limits on teenagers, and preventing an operator from using the vehicle in an unauthorized manner.

5. The interactive natural language interface of the invention can be used to provide Customer Relationship Management (CRM) services to vehicle operators and passengers. The user can interact with the services offered via data networks; video signals, or audio. The interaction can be with automated services or a live Customer Service Representative. Interactions with the customer service representatives can be through any combination of possible techniques, such as, live audio, live video, electronic messaging or email, instant messaging, and other techniques. These services can be offered by a number of entities including, vehicle manufacturers, vehicle dealers, vehicle service organizations, automobile or travel clubs, wireless carriers, travel service organizations, etc. The services offered can be personalized to the occupants of the vehicle using a variety of information including, user profile information, history, location, paths traveled, time of day, day of week, etc. In addition, the system can offer customized services based on information about the vehicle including, paths traveled, distance, service history, type of equipment on vehicle. These services can be access while a person is an occupant in a vehicle, while they are using a wireless or wired network equipped handheld device or while using a wired or wireless network desktop system. Examples of these services include:

a. Location based marketing programs wherein occupants of the vehicle receive promotional offers from merchants along a route of travel. Occupants can query the system for offers and promotions for goods and services along the travel route. The system may apply other available information to form a response, including, the users profile, history and location. The system can provide optimized interactive routing assistance to the vehicle operator. Alternatively, the system can provide interactive offers and promotions for goods and services along the route, or in advance of a particular trip. Promotions can be offered for goods and services can include but are not limited to, travel services, groceries, prepared foods, vehicle service, fuel, and entertainment.

b. Remote ordering and payment for goods and services. The system can interactively present the menu or product catalog using the list and table presentation capabilities of the invention. The system facilitates remote ordering by using location information, customer preferences, customer order history, etc. The system can manage a secure payment wallet for the users. Voiceprints, spoken passwords, and non-speech security methods (i.e. PIN pad, etc.) can be combined to create the appropriate level of security.

c. Travel services for occupants of the vehicle. These services can include, directories of travel and entertainment services, or reservations for entertainment restaurants, hotels and other accommodation. The system may present directories, lists and menus using its interactive list and table presentation capabilities. The travel service capability can be used in conjunction with the remote ordering and payment capabilities and the dynamic interactive routing capability.

d. Answer specialized travel, related questions in areas such as vehicle registration, taxes, safety laws, required inspections, weight limits, insurance coverage requirements, insurance policy provisions, etc.

6. The invention can provide an operator or other occupant of a vehicle with an interactive location sensitive shopping list or a location and time sensitive task reminder list using the natural language speech interface. Users can create the list while in the vehicle, while on foot using a handheld device, or at a fixed location using a handheld or desktop device. A user can grant permission to other users to add tasks or shopping items to their lists. Once in the vehicle the system provides occupants with routing assistance to optimize travel time and reminders of items to purchase and tasks to complete as the vehicle comes in close proximity to a particular location, a type of merchant or other service provider, or when a set time has been reached.

7. Automatic interactive dispatch and reporting for fleet vehicles. The vehicle operator or other vehicle occupants used the speech interface to interact with these services. These services can include, dynamic optimal routing, inventory of parts and other materials, ordering of required parts and materials, work orders, receipt generation, and payments.

8. Sales force automation, sales reporting, contact database management, calendar management, and call routing. The system may employ its interactive list and table presentation capabilities to supply catalog and pricing information. These services can use local or network data. Add ional services can include, memos, reminders and activity lists. Dictation machine.

Vehicle operators and other occupants can use the interactive natural language interactive speech interface of the invention to perform many types of information query, retrieval and presentation operations. Using the natural language interactive speech interface users can modify the parameters of queries or specify the presentation formats for results. Data used to create a response can be from any combination of local and remote data sources. User specific data can be synchronized between systems fixed to one or more vehicles, handheld systems and desktop systems. Some examples of information query, retrieval and presentation applications for the invention include, but are not limited to the following:

1. White pages and yellow pages lookups to find, email addresses, telephone numbers, street addresses and other information for businesses and individuals. These services can be used in conjunction with other services, including remote ordering and payment, offers and promotions, mapping, and driving directions.

2. Management and access to personal address book, calendars and reminders for each user.

3. Automatic telephone dialing, reading and sending emails, pages, instant messaging by voice, text or video and other communications control functions;

4. Selection, schedules and play list management for television, satellite broadcast, radio or other entertainment schedule. The available can include reviews and other information on programming. The system provides device control for users;

5. Weather information for the local area or other locations.

6. Stock and other investment information including, prices, company reports, profiles, company information, business news stories, company reports, analysis, price alerts, news alerts, portfolio reports, portfolio plans, etc.

7. Local, national and international news information including headlines of interest by subject or location, story summaries; full stories, audio and video retrieval and play for stories.

8. Sports scores, news stories, schedules, alerts, statistics, background and history information, and other information.
9. The ability to subscribe interactively to multimedia information channels, including sports, news, business, different types of music and entertainment, applying user specific preferences for extracting and presenting information.
10. Rights management for information or content used or published.
11. Horoscopes, daily jokes and comics, crossword puzzle retrieval and display and related entertainment or diversions;
12. Interactive educational programs using local and network material, with lesson material level set based on user's profile, location of the vehicle, planned route of the vehicle, planned activities during the trip and including, interactive multimedia lessons, religious instruction, calculator, dictionary and spelling, geographic information, instruction for specialized tasks planned during the trip, language training, foreign language translation, presentation of technical manuals, and encyclopedias and other reference material.

It will be appreciated that the foregoing statements of the features of the invention are not intended as exhaustive or limiting, the proper scope thereof being appreciated by reference to this entire disclosure and reasonably apparent variations and extensions thereof.

BRIEF DESCRIPTION OF THE DRAWINGS

The invention will be described by reference to the preferred and alternative embodiments thereof in conjunction with the drawings in which:

FIG. 1 is an overall block diagram of the system according to ant embodiment of the invention;

FIG. 2 is an overall block diagram of the system according to an embodiment of the invention;

FIG. 3. is an overall block diagram of a handheld computer according to an embodiment of the invention;

FIG. 4. is an overall block diagram of a fixed computer according to an embodiment of the invention.

FIG. 5 is an overall diagrammatic view of the; interactive natural language speech processing system according to an embodiment of the invention; and, FIG. 6 is a schematic block diagram showing the agent architecture according to an embodiment of the invention.

DETAILED DESCRIPTION OF THE PREFERRED AND ALTERNATIVE EMBODIMENTS

The following detailed description refers to the accompanying drawings, and describes exemplary embodiments of the present invention. Other embodiments are possible and modifications may be made to the exemplary embodiments without departing from the spirit, functionality and scope of the invention. Therefore, the following detailed descriptions are not meant to limit the invention.

The Telematics natural language speech interface of the invention may be applicable to most any vehicle environment and telematic application. The same system or portions thereof can be used in a vehicle, while on foot through a handheld device or, at a fixed location such as an office or home using a desktop or handheld device, or through other devices. An overall block diagram of one embodiment of the invention is shown in FIG. 1.

A speech unit 128 can be permanently attached to the vehicle 10 or can be part of a handheld device 36 or a fixed home or office computer system 44. The speech unit 128 may be interfaced to a Telematics Control Unit (TCU) 28 through one or more data interfaces 26. In some embodiments, the main speech-processing unit 98 may be embedded in one or more TCU 28. In some embodiments, the components of the speech unit 128 can also be distributed between one or more TCUs.

A speech-processing unit built into a handheld device 36 may be connected with the data interfaces 26 though a wireless or wired handheld interface 20. Other user interface peripherals can be connected to the TCU through the data interfaces and can include, displays 18 including touch screen displays for text, graphics and video, keypads 14 for data input, video cameras 16 for multimedia communications or conferences, and a pointing device or stylus (not shown). Other devices connected to the TCU though the data interfaces can include wide-area RF transceivers 24, and navigation system components 22. The navigation system components can include a number of items, such as, a Global Positioning System (GPS) receiver or other radiolocation system receiver, gyroscope and other inertial measurement equipment, and distance measurement sensors such, as odometers. Radiolocation equipment receives coded signals from one or more satellite or terrestrial sources 40. The one or more location service servers 48 may assist the navigation system. Other systems that can connect to the TCU through the data interfaces can include automotive control computers, digital control interfaces for devices such as media players or other electronic systems, measurement sensors, and specialized electronic equipment.

The control and device interfaces 30 may connect the TCU 28 to various devices on the vehicle 32. The control and device interfaces may be used to execute local or remote commands from users of the natural language speech interface. In some cases the control and device interfaces 30 may include specialized hardware required for interaction with each type of device. The hardware interfaces may include analog or digital signal interfaces for device control along with analog or digital interfaces for measurements required to control the device. These interfaces may also include specialized software encapsulating or abstracting specific behavior of each device. The interface software may include one or more drivers, specific to the hardware interface, and one or more agents. The domain agents may include the specialized software behavior and data required for controlling a particular device or class of devices. New or updated behavior can be added to the system by updating the agents for a specific device or class of devices. For safety, and possibly operator convenience, some devices have manual controls or manual overrides 34. For all safety related devices, the control and device interface may incorporate fail-safe systems, which, for example, may verify operating limits before changing settings, ensuring that commands do not conflict with settings from manual controls, and will not in some combination with other commands or device settings create an unsafe situation. The software behavior and data that may be required to ensure safe operations may be included within the domain agent specific to the device or class of devices. Examples of devices and system that can be controlled through the control and device interfaces include, power management systems, measurement sensors, door locks, window controls, interior temperature controls, shifting of the transmission, turn signals, lights, safety equipment, engine ignition, cruise control, fuel tank switches, seat adjustments, specialize equipment such as winches, lifting systems or loading system, and other systems.

The wide-area RF transceiver 24 may communicate with one or more wide-area wireless networks 38, which are connected to data networks 42, including the Internet, and the Public Switched Telephone Network (PSTN) 42. The wide-area wireless networks can be of any suitable terrestrial or satellite based type. Handheld systems 36 can communicate with one or more local or wide-area wireless networks. Home or office systems 44, equipped with wired or wireless network interfaces communicate through the data networks or PSTN.

In cases where a user uses one or more main speech-processing units 98 attached to vehicles 10, handheld systems 36 or fixed systems 44, data and agents stored in these systems can be synchronized. The synchronization between these different systems can occur on the wide area wireless network 38, the data network 42, through the handheld interface 20, or other local data connections. The synchronization can be performed automatically when any two or more of the computers are connected to these networks. Alternatively the synchronization can be performed on demand under control of the user. The synchronization process attempts determine which version of a data element or an agent are the newest or most up to date and will propagate that element. Thus, synchronization is an incremental change processes. In some cases, a complete replacement of a database or portion of a database or of one or more agents may be performed rather that a series of incremental updates.

The wide-area wireless networks 38, the data networks 42 and PSTN, may connect the invention 98, 128 on vehicles 10, in handheld devices 36 and fixed computers 44 to one or more servers, which provide one of more services. In every case, the invention may provide an interactive natural language speech user interface to the services offered. Virtually any service, involving the transfer of data or transmission of speech and video, can be supported through the natural language speech interface. For data centric applications a standardized data transfer format is, typically used, including for example, Hypertext Markup Language over Hypertext Transfer Protocol (HTTP), Extensible Markup Language (XML), possibly employing a variety of data formats or schemas, over HTTP or other transfer protocol, Electronic Data Interchange formats over a variety of transport protocols, etc. Examples of services being offered have already been discussed. It will be understood that the exact configuration of the servers may be determined by many considerations including, the exact combinations of services being offered, the service providers providing the services, the contractual relationships between the service provider, and other factors, and that the invention can support most any suitable configuration. In each case these servers may themselves be distributed over one or more public or private networks. Some examples the servers, which may be used to deliver these services, are given below:

1. One or more payment service providers 56 supply payment capabilities to users of the invention. These payment services can include electronic wallet capabilities, for one or more payment accounts, and which can include, payment security information, payment account information, transaction histories, and account balance information. The payment services are used for any of the services supplied by the invention. Suitable payment types include, stored value accounts, promotional accounts, credit accounts, telecommunications billing accounts, and debit accounts using online or offline methods. Payments can be computed in any manner including payment for a specific good or service, subscription payment or metered payment. The payment services can be distributed in a number of ways. Examples of computers and servers used to store and process payment transaction information include, smart cards, main speech processing units 128, handheld computers 36, TCUs 28, fixed personal computers 44, payment gateways, and payment servers 56.

2. One or more Customer Relationship Management (CRM) systems 52 may supply any number of consumer and business customer services as has already been discussed above. The CRM system can supply automated services or services that are partly or completely manual. For manual services one or more customer service representatives use one or more service representative workstations 54. The CRM system and the service representative workstation can be connected to one or more data networks 42 and the PSTN. Any other servers may also have connections to one or more service representative workstations, which may be in common or independent of each other.

3. One or more specialized service servers 50, which support specialized consumer and business services. Examples of these specialized services have been presented in the foregoing discussion.

4. One or more location service servers 48, which supply location information and location based services. The location data is used as a data input to the location services, which can then be distributed in any suitable manner including, on main speech processing units 128, handheld computers 36, TCUs 28, fixed personal computers 44, other servers (i.e. 46, 50, 52, 56) and the one or more location services servers 48. Examples of possible location services have been presented in the previous discussion.

5. One or more emergency services servers 46, which supply both public and private emergency services to the users, Examples of possible emergency services have been presented in the previous discussion.

As has already been stated, the main speech processing unit 98 and the speech unit 128 can be distributed in a vehicle in a number of ways. For example, these units can be attached to the vehicle as independent components or as a single integrated component. Alternatively, some or all of the main speech processing unit 98 and speech unit 128 can be embedded in one or more of the TCUs 28, handheld computers 36 and fixed computer systems 44.

A block diagram of a second possible embodiment of the invention is shown FIG. 2. In this embodiment, the main speech processing unit 98 and speech unit 128 are external to the TCU 28. These components can be housed in one or more packages or included in a single integrated package.

In all other respects, the second embodiment is identical to the first embodiment. It will be understood that the exact distribution and packaging of the main speech processing unit 98 and speech unit 128, can be determined by the details of the deployment situation and will not change the functionality, capabilities or spirit of the invention in any way.

As has already been mentioned, a handheld computer 36 can be used as a component of the invention. A block diagram of one possible embodiment of the handheld computer is shown in FIG. 3.

In some embodiments, the main speech processing unit 98 and speech unit 128 may be embedded into the handheld computer 36. The main speech processing unit interfaces to the handheld computer's one or more processing units 70. The processing units may include one or more central processing units, one or more data and address busses, data interfaces and volatile memory. The processing unit 70 uses one of more types of nonvolatile memory 80 for software and data storage. Suitable types of nonvolatile memory 80 include flash memory and hard disk drives. In some embodiments, the main speech processing unit 98 can be integrated with the one or more processing units 70.

In some embodiments, users interact with the handheld computer 36 through the speech unit 128, the keypad 74 or keyboard, and a display 72 for text, graphics and video. In some embodiments the display is of a touch screen type. An optional pointing device (not shown) may be used as well.

The handheld computer 36 can connect to one or more wired or wireless wide-area or local-area networks through one or more interfaces. A wide-area network transceiver 78 can connect to the wide-area wireless network 38 or the data network 42, using a wireless or wired connection, including a dial PSTN network connection. The local-area network transceiver 76 connects to wired or wireless local area networks. These networks can include the handheld interface 20 or connections to fixed computer systems 44.

As has already been mentioned a fixed computer 44 can be used as a component of the invention. A block diagram of one possible embodiment of the fixed computer is shown in FIG. 4.

In some embodiments, the main speech processing unit 98 and speech unit 128 may be embedded into the fixed computer 44. The main speech processing unit may interface to the fixed computer's one or more processing units 84. The processing units may include one or more central processing units, one or more data and address busses, data interfaces and volatile memory. The processing unit may use one of more types of nonvolatile memory 94 for software and data storage. Suitable types of nonvolatile memory include, for example, flash memory and hard disk drives. In some embodiments, the main speech processing unit 98 can be integrated with the one or more processing units 84.

In some embodiments, users may interact with the fixed computer 44 through the speech unit 128, the keyboard 88 or keypad, and a display 86 for text, graphics and video. In some embodiments the display is of a touch screen type. An optional pointing device (not shown) may be used as well.

The fixed computer 44 can connect to one or more wired or wireless wide-area or local-area networks through one or more interfaces. A wide-area transceiver 92 can connect to the wide-area wireless network 38 or the data network 42, using a wireless or wired connection, including a dial PSTN network connection. The local-area network transceiver 90 connects to wired or wireless local area networks. These networks can include connections to the handheld computer 36.

The natural language interactive speech processing system may make maximum use of context, prior information, location information, domain information and user specific profile data to achieve a natural environment for one or more users making queries or stating commands across multiple domains. Through this integrated approach a complete speech-based natural language query and command environment for telematic applications is created. The telematic natural language speech interface can be deployed as part of or a peripheral to a TCU or other vehicle computer, as part of a handheld computer interfaced to vehicle computers and other system through wired, wireless, optical, or other types of connections or fixed computers interfaced to the vehicle computers or other systems through a combination of wired, wireless, optical and/or other types of connections. Alternatively, the components of the interactive natural language telematic speech interface can be distributed in any suitable manner between these multiple computing platforms.

Regardless of the method of deployment the invention provides the required functionality. FIG. 5 shows an overall diagrammatic view of the interactive natural language speech processing system according to one embodiment of the invention.

The event manager 100 may mediate interactions between other components of the invention. The event manager can provide a multi-threaded environment allowing the system to operate on multiple commands or questions from multiple user sessions without conflict and in an efficient manner, maintaining real-time response capabilities.

Agents 106 may include packages of both generic and domain specific behavior for the system. Agents may use the nonvolatile storage for data, parameters, history information, and locally stored content provided in the system databases 102 or other local sources. User specific data, parameters, session information, location data and history information determining the behavior of agents are stored in one or more user profiles 110. Agents for commands typically include domain knowledge specific to the device or devices under control. Data determining system personality characteristics for agents are stored in the one or more personalities 108. The update manager 104 manages the automatic and manual loading and updating of agents and their associated data from the Internet 42 or other network through the network interface 116.

The main user interface for the invention is through one or more speech units 128. The speech unit 128 includes one or more microphones, for example array microphone 134, to receive the utterances of the user. Alternatively, one or more external microphones can be used. The speech received at the microphone 134 may be processed by filters 132 and passed to the speech coder 138 for encoding and compression. In one preferred embodiment, a transceiver module 130 transmits the coded speech to the main unit 98. Coded speech received from the main unit is detected by the transceiver 130, then decoded and decompressed by the speech coder 138 and annunciated by the speaker 136. The speech units can be attached to a vehicle 98, 128, in a handheld device 36, or embedded in or attached to a fixed system 44.

The one or more speech units 128 and the main unit 98 may communicate over a communication link. The communication link can include a wired or wireless link. According to one embodiment, the communication link having an RF link. The transceiver 130 on the speech unit communicates coded speech data bi-directionally over the communication link with the transceiver 126 on the main unit 98. According to another embodiment, the RF link can use any standard local area wireless data protocols including the IEEE 802.11, Bluetooth or other standards. Alternatively, an infrared data link conforming to any suitable standard such as IrDA or other infrared standards can be used. In an alternative embodiment, wires, optical fibers or other connection techniques may connect the speech unit and the main unit, eliminating the need for a speech coder 138. Other wired or wireless analog or digital transmission techniques can be used. The main speech processing unit 128 can be attached to a vehicle, embedded in one or more TUCs 28, in a handheld computer 36, attached as a peripheral to a fixed computer 44 or embedded in a fixed computer 44. The speech unit can be integrated with the main unit or can be configured as a separate attachment.

Coded speech received at the transceiver 126 on the main unit 98 may be passed to the speech coder 122 for decoding and decompression. The decoded speech can be processed by the speech recognition engine 120 using data in the dictionary and phrases module 112 and received from the agents 106. The recognized words and phrases may be processed by the parser 118, which transforms them into complete commands and questions using data supplied by the agents. The agents can then process the commands or questions. The agents create queries to local databases 102 or though the network interface 116 to data sources on the Internet 42 or other networks. Commands typically result in actions taken by the system itself (i.e., pause or stop), or to a remote device or data source (i.e., download data or program, or control a local or remote device), through the network interface to the Internet or other data interface.

The agents 106 may return results of questions as responses to users. The response can be created using the results of information queries, the system personality 108 and the user preferences or other data in the user profile 110. The agents generally present these results using the speech unit 128. The agent may create a response string, which may be sent to the text to speech engine 124. The text to speech engine creates the required utterances, which may be encoded and compressed by the speech coder 122. Once coded, the utterances may be transmitted from the main unit 98 by the transceiver 126 to the transceiver 130 on the speech unit 128. The utterance may then be decoded and decompressed by the speech coder 138 and output by the speaker 136.

The graphical user interface 114 can be used as a substitute or complement to the speech interface. For example, the graphical user interface can be used to view and interact with graphical or tabular information in a manner more easily digested by the user. The graphical user interface can include a display 18, keypad 14, and pointing device (not shown). Alternatively, the graphical user interface can be implemented using the capabilities of a handheld computer 36 or fixed computer 44. The graphical user interface can show system state and history in a more concise manner than the speech interface. Users can use the graphical user interface to create or extend agents 106. These operations can include scripting of agents, adding data to the agent or databases 102 used by the agent, adding links to information sources;

In some embodiments of the invention, generic and domain specific behavior and information is organized into agents. The system agent provides default functionality and basic services. The domain specific agents may provide complete, convenient and re-distributable packages or modules for each application area. In other words, an agent may include everything needed to extend or modify the functionality of the system in a current or new domain. Further, agents and their associated data can be updated remotely over a network as new behavior is added or new information becomes available. Agents may access a plurality of sources that may provide various services. Agents can use the services of other, typically more specialized, agents and the system agent. Agents are distributed and redistributed in a number of ways including on removable storage media, transfer over networks or attached to emails and other messages. The invention may provide license management capability allowing the sale of agents by third parties to one or more users on a one time or subscription basis. In addition, users with particular expertise can create agents, update existing agents by adding new behaviors and information and making these agents to other users; A block diagram of the agent architecture according to an embodiment of the invention is shown in FIG. 6.

Agents 106 may receive and return events to the event manager 100. Both system agents 150 and domain agents 156 receive questions and commands from the parser 118. Based on the keywords and command structure, the parser may invoke the required agent. Agents may use the nonvolatile storage for data, parameters, history information and local content provided in the system databases 102. When the system starts-up or boots-up, the agent manager 154 may load and initialize the system agent 150 and the one or more domain agents 156. At shutdown the agent manager may unload the agents. The agent manager may also performs license management functions for the domain agents and content in the databases 102.

The system agent 150 may manage the criteria handlers 152, which may handle specific parameters or values (criteria) used to determine context for questions and commands. Both the system agent 150 and the domain agents 156 can use the criteria handlers 152. The various domain agents 156 can use the services of the system agent 150 and of other, typically more specialized, domain agents 156. The system agent 150 and the domain agents 156 can use the services of the agent library 158, which may include utilities for commonly used functions. The library 158 may include utilities for text and string handling, network communications, database lookup and management, fuzzy and probabilistic evaluation, text to speech formats, and other utilities.

Domain agents 156 can be data-driven, scripted or created with compiled code. A base of generic agent is used as the starting point for data-driven or scripted agents. Agents created with compiled code are typically built into dynamically linkable or loadable libraries. Developers of agents 106 can add new functionality to the agent library 158 as required. Details of agent distribution and update, and agent creation or modification are discussed in sections below.

The invention provides capabilities to distribute and update system agents 150, domain agents 156, agent library components 158, databases 102, and dictionary and phrase entries 112 over wireless or wired networks 42, including dial-up networks using the update manager 104. The network interface 116 may provide connections to one or more networks. The update manager 104 may also manage the downloading and installation of core system updates. The agent manager 154 may perform license management functions for the domain agents and the databases. The update manager 104 and agent manager 154 may perform these functions for all agents and database content including, agents and content available to all users or agents and content only available to certain users. Examples of agent and database components added or updated on a periodic basis include: 1) agents for new domains; 2) agents for new commands; 3) agents for new devices added to the vehicle or remote devices; 4) agents for new or updated behavior for existing devices on the vehicle or remote devices; 5) additional domain knowledge for agents; 6) new keywords for a domain, which can include names of politicians, athletes, entertainers, names of new movies or songs, new command words, and or other names and words; 7) links to a preferred set of information sources for the domains covered including links for, entertainment, news, sports, weather, and other topical sites; 8) updates to domain information based on, for example, changes to tax laws, company mergers, changing political boundaries, new safety rules; 9) updates to content, including dictionaries, encyclopedias and almanacs; and 10) other content and database components.

When the user requires or selects a new agent 156 or database element 102, the update manager 104 may connect to the source on the network 42 though the network interface 116, and may download and install the agent and/or data. To save system resources and to comply with any license conditions, the update manger 104 may uninstall agents 106 that are no longer in use. In some embodiments, the update manager may periodically queries the one or more sources of the licensed agents and database components to locate and down load updates to agent executables, scripts or data as they become available. In other embodiments, the agent sources may initiate the downloading of agent updates of the registered or licensed agents to the update manager 104 as they become available.

The agent manager 154 may provide a license management client capable of executing most any license terms and conditions. When a particular agent 106 or database elements 102 is required by a command, the agent manger may verify that the use of the agent or data element is within the allowed terms and conditions, and if so, invokes the agent or allows access to the data element. License management schemes that can be implemented through the agent manager 154 includes out right purchase, subscription for updates, one time or limited time use. Use of shared agents and data elements (such as those down-loaded from web sites maintained by groups of domain experts) may also be managed by the agent manager.

If a question or command requires an agent currently not loaded on the system, the agent manager 154 can search the network 42 through the network interface 116 to find a source for a suitable agent. This process can be triggered, for example, when a query is made in a domain for which an agent is not available, or when a new device is added to a vehicle or the behavior of a device is updated. Once located, the agent can be loaded under control of the update manager 104, within the terms and conditions of the license agreement as enforced by the agent manger.

New commands, keywords, information, or information sources can be added to any domain agent 156 by changing agent data or scripting. These configuration capabilities allow users and content developers to extend and modify the behavior of existing agents or to create new agents from a generic agent without the need to create new compiled code. Thus, the modification of the agents can range from minor data-driven updates by even the most casual users, such as specifying the spelling of words, to development of complex behavior using the scripting language as would typically be done by a domain expert. The user can create and manage modifications to agents through speech interface commands or using a graphical user interface 114. User-specific modifications of agents are stored in conjunction with the users profile and accessed by the agent at run-time.

The data used to configure data driven agents 156 may be structured in a manner to facilitate efficient evaluation and to help developers with organization. These data can be used not only by the agent, but also in the speech recognition engine 120, the text to speech engine 124, and the parser 118. Examples of some major categories of data include:

1. Content packages may include questions or commands. Each command or question or group of commands or questions may include contexts used for creation of one or more queries. The agent 156 can pass a regular grammar expression to the parser 118 for evaluation of a context or question. An initial or default context is typically supplied for each command or question. The command or question includes a grammar for the management and evaluation of the context stack.
2. Parameters and other operating data on devices that are under control of the natural language speech interface. The agent 156 may use these data and parameters to determine how to execute a command, how to formulate the command string for the parser 118, determine if the command is feasible, and determine if the command can be executed within safety and operating limits.
3. Page lists or pointers to other local or network content sources. For each page or content source there may be a pointer (e.g. URL, URI, or other pointer) to the page or source. Each page may have specific scraping information used to extract the data of interest. The scraping information may include, for example, matching patterns, HTML or other format parsing information.
4. A response list, determining the response of the agent to a particular command or question given the context, the user profile and the information retrieved. Responses can include diagnostic error messages or requests for more information if the question or command cannot yet be resolved from the known information. Responses can be based on or dependent on thresholds or probabilistic or fuzzy weights for the variables.
5. Substitution lists that include variable substitutions and transformations, often applied by the agents 150, 156 in the formatting of queries and results. For example, a stock domain specific agent 156 would use a substitution list of company trading symbols, company names and commonly used abbreviations. Substitutions and transformations can be performed on commands and questions to create precise queries, which can be applied against one or more information sources or to results for creating more meaningful output to the user. Substitution lists also include information for optimally dealing with structured information, such as HTML formatted page parsing and evaluation.
6. Personalities used for responses. Personalities can be constructed by combining multiple traits in a weighted manner. Weights can be specified for each agent's domain area to create one or more specific personalities. Examples of personality traits include, sarcasm, humor, irritation, and sympathy, and other traits.
7. Public and user specific parameters for sources, substitutions, transformations, variables or criteria. The public parameter lists are part of the agent package 156. The user specific parameters are included in the user profile 110.

Commands and questions are interpreted, queries formulated, responses created and results presented can be based on the user's personal or user profile 110 values. Personal profiles may include information specific to the individual, their interests, their special use of terminology, the history of their interactions with the system, and domains of interest. The personal profile data can be used by the agents 106, the speech recognition engine 120, the text to speech engine 124, and the parser 118. Preferences can include, special (modified) commands, past behavior or history, questions, information sources, formats, reports, and alerts. User profile data can be manually entered by the user and/or can be learned by the system based on user behavior. User profile values can include: 1) spelling preferences; 2) date of birth for user, family and friends; 3) income level; 4) gender; 5) occupation; 6)location information such as, home address, neighborhood, and business address, paths traveled, locations visited; 7) vehicle type or types; 8) vehicle operator certifications, permits or special certificates; 9) history of commands and queries; 10) telecommunications and other service providers and services; 11) financial and investment information; 12) synonyms (i.e., nick name for someone, different terms for the same item); 13) special spelling; 14) keywords; 15) transformation or substitution variables; 16) domains of interest; and, 17) other values.

End users can use the data driven agent 156 extension and modification facilities and values stored in user profiles 110 to create special reports, packages of queries, alerts and output formats. A single alert or report can be configured to use multiple data sources and other variables (i.e., time, location, measured value) value to condition to determine when alerts should be sent. For example, an alert can be generated by sampling a stock price every 15 min and sending an alert if the price drops below some value. In another example, a user can create an alert when a particular condition or combination of conditions occurs on the vehicles. Alerts and reports can be directed to a local or remote output.

To create a report, the user may first specify a set of commands or questions. Next, the user can create or select a format for the report. Finally the user may name the report. A report can have variable parameters. For example, a user may create a company stock report, and execute the report by stating its name and the company name, which gives the user selected information and in a specified format for that company. In another example, a user can create a "morning" report, which presents selected multimedia information from different sources (news, sports, traffic, weather) in the order and formats desired. In yet another example, the user can create a report on the status of one or more vehicle systems. Alerts and reports can be created using only voice commands and responses, commands and responses through the graphical user interface 114, or a combination of the two. Reports can be run locally or remotely with respect to the vehicle. To create a report, alert, or other specialized behavior, the user performs a number of steps including: 1) specify the command to run a report or alert; 2): specify the question or questions, including keywords, used for a query; 3) set the criteria for running the report such as on command or when a particular condition is met; 4) define preferred information sources; 5)define preferences for order of result evaluation by source, value, and other parameters; 6) specify the presentation medium for a report or alert, such as an email, the text to speech engine, a message to a pager, or a text and graphics display; and, 7) specify the preferred format for the report, such as information to be presented, order of information to be presented, preferred abbreviations or other variable substitutions.

Filtering and noise elimination may be a key aspect of the invention allowing it to operate in noisy vehicle environments. The accurate recognition and parsing of the user's speech requires the best possible signal to noise ratio at the input to the speech recognition engine 120. To accomplish the required improvements an array microphone 134 and a filter 132 may be employed. In one embodiment the microphone array, filters and speech coder 138 are physically separated from the main unit 98 into a speech unit 128, and connected using a wireless link. Since bandwidth on a wireless connection is at a premium the speech coder dynamically adapts the digitization rate and compression of the captured speech.

Some embodiments of the invention may use one or more arrays of microphones 134 to provide better directional signal capture and noise elimination than can be achieved with a single microphone. The microphone array can be one-dimensional (a linear array) or two-dimensional (a circle, square, triangle or other suitable shape). The beam pattern of the array can be fixed or made adaptive though use of analog or digital phase shifting circuitry. The pattern of the active array is steered to point in the direction of the one or more users speaking. At the same time nulls can be added to the pattern to notch out point or limited area noise sources. The use of the array microphone also helps reduce the cross talk between output from the text to speech engine 124 through the speaker 136 or from another user talking and detection of the user's speech.

The invention may use an analog or digital fitter 132 between the array microphone or conventional microphone 134 and the speech coder 138. The pass band of the filter can be set to optimize the signal to noise ratio at the input to the speech recognition engine 120. In some embodiments, the filter is adaptive, using band shaping combined with notch filtering to reject narrow-band noise. One embodiment employs adaptive echo cancellation in the filter. The echo cancellation helps prevent cross talk between output from the text to speech engine and detection of the user's speech as well as suppression of environmentally caused echoes. Algorithms comparing the background noise to the signal received from the users speech may be used to optimize the band-shaping parameters of the adaptive filter.

The speech received by the array microphone 134 and passed through the filter 132 may be sent to the speech digitizer or coder 138. The speech coder may use adaptive lossy audio compression to optimize bandwidth requirements for the transmission of the coded speech to the speech recognition engine 120 over a wireless link. The lossy coding is optimized to preserve only the components of the speech signal required for optimal recognition. Further, the lossy compression algorithms used are designed to prevent even momentary gaps in the signal stream, which can cause severe errors in the speech recognition engine. The digitized speech is buffered in the coder and the coder adapts the output data rate to optimize the use of the available bandwidth. The use of the adaptive speech coder is particularly advantageous when a band-limited wireless link is used between the coder and the speech recognition engine.

The microphone can be complemented with an analog or digital (i.e., Voice over IP) speech interface. This interface allows a remote user to connect to the system and interact with it in the same manner possible if they were physically present.

In an alternative embodiment, the array microphone can be replaced by a set of physically distributed microphones or headsets worn by the users. The distributed microphones can be placed in different parts of a vehicle or room or in different rooms of a building. The distributed microphones can create a three-dimensional array to improve signal to noise ration. The headset can use a wireless or wired connection.

While the invention is intended to be able to accept most any natural language question or command, ambiguity can still be a problem. To assist users formulate concise questions and commands, the system can support a voice query language. The language may be structured to allow a variety of queries and commands with minimal ambiguity. Thus, the voice query language helps users clearly specify the keywords or contexts of the question or command along with the parameters or criteria. The language can provide a grammar to clearly specify the keyword used to determine the context and present a set of one or criteria or parameters. A user asking a question or stating a command in the voice query language may nearly always be guaranteed to receive a response.

The voice query language can be sensitive to the contents of the context stack. Thus, a following-on question or command can be asked using an abbreviated grammar, since key words and criteria can be inherited from the stack. For example, the user can simply asked about another keyword if the criteria of the question remain constant.

The system may provide built in training capabilities to help the user learn the best methods to formulate their questions and commands. The interactive training allows the user to audibly or visibly see the machine interpretation of their queries and provides suggestions on how to better structure a query. Using the interactive training a user can quickly become comfortable with the voice query language and at the same time learn how to optimize the amount of information required with each step of a dialog.

The output of the speech coder 122 may be fed to the speech recognition engine 120. The speech recognition engine 120 may recognize words and phrases, using for example, information in the dictionary and phrase tables 112, and pass these to the parser 118 for interpretation. The speech recognition engine 120 may determine the user's identity by voice and name for each utterance. Recognized words and phrases are tagged with this identity in all further processing. Thus, as multiple users engage in overlapping sessions, the tags, added by the speech recognition engine 120 to each utterance, may allow other components of the system to tie that utterance to the correct user and dialog. The user recognition capability can also be used as a security measure for applications, such as auctions or online shopping, where this is required. Voice characteristics of each user may be included in the user profile 110.

A dialog with the system may begin when a user first addresses it. This can be done by speaking a generic word ("computer") and/or addressing a specific name ("Fred"), which is generally tied to a system personality 108. Once the user starts the dialog, they may be recognized by the speech recognition engine 120, using unique characteristics of their speech. At the end of a dialog or to interrupt a dialog, the user may speak a dismissal word ("good by").

Some embodiments may employ a speech recognition engine 124 seeding for improved word recognition accuracy using, for example, data from the dictionary and phrase tables 112, user profiles 110, and the agents 106. At the same time the fuzzy set possibilities or prior probabilities for the words in the dictionary and phrase tables may be dynamically updated to maximize the probability of correct recognition at each stage of the dialog. The probabilities or possibilities can be dynamically updated based on a number of criteria including the application domain, the questions or commands, contexts, the user profile and preferences, user dialog history, the recognizer dictionary and phrase tables, and word spellings.

For uncommon words or new vocabulary words, the user may be given the option to spell the words. The spelling can be done by saying the names or the letters or using a phonetic alphabet. The phonetic alphabet can be a default one or one of the user's choosing.

Alternatively, when a user speaks a word that is not recognized correctly or not recognized at all by the speech recognition engine 120, then they may be asked to spell the word. The speech engine may determine this condition based on confidence level for the scoring process. The word may be looked up in the dictionary 112 and the pronunciation for the word may be added to either the dictionary, the agent 106, or the user's profile 110. The word pronunciation can then be associated with the domain, the question, the context and the user. Though this process the speech recognition engine learns with time and improves accuracy. To assist users in spelling words an individualized phonetic alphabet can be used. Each user can modify the standard phonetic alphabets with words, which they can remember more easily.

Once the words and phrases have been recognized by the speech recognition engine 120, the tokens and user identification may be passed to the parser 118. The parser examines the tokens for the questions or commands, context and criteria. The parser may determine a context for an utterance by applying prior probabilities or fuzzy possibilities to keyword matching, user profile 110, dialog history, and context stack contents. The context of a question or command may determine the domain and thereby, the domain agent 156, if any, to be invoked. For example, a question with the keywords "temperature" implies a context value of weather for the question. Within a different dialog, the keyword "temperature" can imply a context for a measurement. The parser dynamically receives keyword and associated prior probability or fuzzy possibility updates from the system agent 150 or an already active domain agent 156. Based on these probabilities or possibilities the possible contexts are scored and the top one or few are used for further processing.

The parser 118 may use a scoring system to determine the mostly likely context or domain for a user's question or command. The score can be determined from weighting a number of factors including, the user profile 110, the domain agent's 156 knowledge and previous context. Based on this scoring, the system may invoke the correct agent. If the confidence level of the score is not high enough to ensure a reliable response, the system can ask a question of the user to verify the question or command is correctly understood. In general the question may be phrased to indicate the context of the question including all criteria or parameters. For example, the question can be in the form of: "Did I understand that you want such-and-such." If the user confirms that the question is correct, the system may proceed to produce a response. Otherwise, either the user can rephrase the original question, perhaps adding additional information to remove ambiguity, or the system can ask one or more questions to attempt to resolve the ambiguity.

Once the context for the question or command has been determined, the parser 118 can invoke the correct agent 156, 150. To formulate a question or command in the regular grammar used by agents, the parser will preferably determine required and optional values for the criteria or parameters. These criteria may have been explicitly supplied by the user or may need to be inferred. The parser may make use of the criteria handlers 152 supplied by the system agent. The criteria handlers can provide context sensitive procedures for extracting the criteria or parameters from the user's question or command. Some criteria may be determined by executing algorithms in the agent, while others may be determined by applying probabilistic or fuzzy reasoning to tables of possible values. Prior probabilities or fuzzy possibilities and associated values may be received from a number of sources including, for example, the history of the dialog, the user profile 110, and the agent. Based on user responses, the prior probabilities or fuzzy possibilities may be updated as the system learns the desired behavior. For a weather context, examples of criteria include, location, date and time. Other criteria can include command criteria (i.e., yes/no, on/off, pause, stop), and spelling. Special criteria handlers are available from the system agent for processing lists, tables, barge-in commands, long strings of text and system commands.

The criteria handlers 152 can operate iteratively or recursively on the criteria extracted to eliminate ambiguity. This processing may help reduce the ambiguity in the user's question or command. For example, if the user has a place name (or other proper noun) in their utterance the parser 118 can use services of the domain agent 156 to look up tables in the databases 102 for place names or can attempt to determine which word is the proper noun from the syntax of the utterance. In another example, the user asks, "what about flight one hundred and twenty too?" The parser and domain agent use flight information in the database and network information along with context to determine the most plausible interpretation among; flight 100 and flight 20 also, flight 100 and flight 22, flight 122, etc.

Once the context and the criteria are determined, the parser 118 may form the question or command in a standard format or hierarchical data structure used for processing by the agents 150, 156. The parser 118 may fill in all required and some optional tokens for the grammar of the context. Often the tokens must be transformed to values and forms acceptable to the agents. The parser obtains the required transformations from the agents, dialog history or user profile 110. Examples of transformations or substitutions performed by the parser on tokens include: 1) substituting a stock symbol for a company name or abbreviation; 2) substituting a numerical value for a word or words; 3) adding a zip code to an address; and, 4) changing a place or other name to a commonly used standard abbreviation.

The agents 150, 156 may receive a command or question once the parser 118 has placed it in the required standard format. Based on the context, the parser can evoke the correct agent to process the question or command.

Commands can be directed to the system or to an external entity. System commands are generally directed to the system agent 150. Commands for external entities are generally processed by a domain agent 156, which includes the command context and behavior for the external entity.

Specific questions may be generally directed to one of the domain agents 156. The real-time selection of the correct agent allows the invention to dynamically switch contexts. Based on the question, command or context and the parameters or criteria, the domain agent may create one or more queries to one or more local or external information sources. Questions can be objective or subjective in nature. Results for objective questions can often be obtained by structured queries to one or more local or network information sources. Even for objective questions, the system may need to apply probabilistic or fuzzy set analysis to deal with cases of conflicting information or incomplete information. Information to answer subjective questions is generally obtained by one or more ad-hoc queries to local or network data sources, followed by probabilistic or fuzzy set evaluation of the one results to determine a best answer.

Once the domain agent 156 has formulated the one or more queries, they may be sent to local and/or network information sources. The queries may be performed in an asynchronous manner to account for the fact that sources respond at different speeds or may fail to respond at all. Duplicate queries can be sent to different information sources to ensure that at least one source responds with a useful result in a timely manner. Further, if multiple results are received in a timely manner, they can be scored by the system to determine which data is most reliable or appropriate. Examples of data sources accommodated include, HTTP data sources, sources with meta-data in various formats including XML, measurement data from sensors using various formats, device 32 setting parameters, entertainment audio, video and game files including MP3, databases using query languages and structured responses such as SQL, and other data sources.

The local information sources can be stored in one or more system databases 102 or can be on any local data storage such as a set of CDs or DVDs in a player or other local data storage. In other cases, local information can be obtained from vehicle system settings or measurement devices. Network information sources can be connected to, the control and device interfaces 30, the data interfaces 26, the Internet 42 or other network and accessed through a series of plug-ins or adaptors, known a pluggable sources, in the network interface 116. The pluggable sources are capable of executing the protocols and interpreting the data formats for the data sources of interest. The pluggable source provides information scrapping forms and procedures for each source to the domain agents 156. If a new type of data source is to be used a new plug-in or adaptor can be added to the appropriate interface.

The domain agent 156 can evaluate the results of the one or more queries as they arrive. The domain agent may score the relevance of the results based on results already received, the context, the criteria, the history of the dialog, the user profile 110 and domain specific information using probabilistic or fuzzy scoring techniques. Part of the dialog history is maintained in a context stack. The weight of each context for the scoring may be based on the relevance of one context to another and the age of the contexts. Other scoring variables can be associated through the context stack. Contexts can also be exclusive, so that previous contexts have no weight in the scoring.

Based on the on-going scoring processes, the domain agent 156 may determine if a single best answer can be extracted. For most questions, the desired result may include a set of tokens that may be found to formulate an answer. Once a value has been found for each of these tokens, the results are ready for presentation to the user. For example, for a question on weather, the tokens can include the date, day of week, predicted high temperature, predicted low temperature, chance of precipitation, expected cloud cover, expected type of precipitation and other tokens. Results processed in this manner may include error messages. For subjective questions, this determination is made by determining a most likely answer or answers, extracted by matching of the results received. If no satisfactory answer can be inferred from the results of the query, the agent can do one of the following:

1. Ask the user for more information, typically through the speech interface, and based on the results obtained formulate new queries. This approach is applied when an irresolvable ambiguity arises in the formulation of a response.
2. Formulate new queries based on the results received from the first set of queries. This approach is typically applied in cases where the responses received do not include all the required information. Information sources to queries can be inferred from the results already obtained (i.e., links in an HTML document or measurements or settings from other devices 32) or from other sources. Using this approach one or more sets of queries and responses can be chained without the need for action by the user.
3. Wait for additional queries to return results.

In any case, the domain agent 156 may continue to make queries and evaluate results until a satisfactory response is constructed. In doing so, the agent can start several overlapping query paths or threads of inquiry, typically mediated by the event manager 100. This technique, combined with the use of asynchronous queries from multiple data sources provides the real-time response performance required for a natural interaction with the user.

The domain agent 156 may apply conditional scraping operations to each query response as it is received. The conditional scraping actions may depend on the context, the criteria, user profile 110, and domain agent coding and data. For each token to be extracted a scraping criteria 152 can be created using the services of the system agent 150. The scraping criteria may use format specific scraping methods including, tables, lists, text, and other methods. One or more scraping criteria can be applied to a page or results set. Once additional results are received, the domain agent can create new scraping criteria to apply to results already acquired. The conditional scarping process removes extraneous information, such as graphics, which need not be further processed or stored, improving system performance.

Specific commands are generally directed to one of the domain agents 156. The real-time selection of the correct agent allows the invention to dynamically switch contexts.

Command oriented domain agents 156 evaluate the command and the state of vehicle systems, system capabilities, and measurements to determine if the command can be executed at all or if doing so will exceed operating or safety limits. If the command is ambiguous or cannot be executed for some other reason, the system may ask the user for more information or may suggest what the problem is and a likely approach to the solution. The domain agent may format the command for the specific device 32 and control and device interface 30. This formatting may involve variable substitution, inference of missing values and other formatting. Variable substitution and inference depends on the command context, the user profile 110, command history, state of vehicle systems and measured values, and other factors. A complex command can result in more atomic commands being sent to multiple devices, perhaps in a sequence. The sequence and nature of subsequent commands may depend on the previous commands, results of pervious commands, device settings and other measurements. As a command is executed, measurements are made and results collected to determine if the execution was correct and the desired state or states were reached.

Once the domain agent 156 has created a satisfactory response to a question, or to a command, the agent may format that response for presentation. Typically, the domain agent can format the response into the markup format used by the text to speech engine 124. The domain agent may format the result presentation using available format templates and based on the context, the criteria, and the user profile 110. The domain agent may perform variable substitutions and transformations to produce a response best understood and most natural to the user. The domain agent may vary the order of presentation of tokens and the exact terminology used to create a more natural response to the user. The domain agent may also select the presentation personality 108 to be used.

For both command and query responses, the domain agent 156 may select the presentation template, determine order of presentation for tokens and determine variable substitutions and transformations using probabilistic or fuzzy set decision methods. The template used to form the presentation can be from the domain agent itself or from the user profile 110. The user profile can completely specify the presentation format or can be used to select and then modify an existing presentation format. Selection and formatting of presentation template can also depend on the presentation personality 108. At the same time, the characteristics of the personality used for the response are dynamically determined using probabilities or fuzzy possibilities derived from the context, the criteria, the domain agent itself and the user profile 110.

The domain agent 156 may apply a number of transformations to the tokens before presentation to the user. These variable substitutions and transformations may be derived from a number of sources including, domain information carried by the agent, the context, the token values, the criteria, the personality 108 to be used, and the user profile 110. Examples of variable substitutions and transformations include: 1) substitution of words for numbers; 2) substitution of names for acronyms or symbols (i.e., trading symbols); 3) use of formatting information derived from the information sources (i.e., HTML tags); 4) nature of the response including, text, long text, list, table; 5) possible missing information or errors; 6) units for measurement (i.e., English or metric); and, 7) preferred terminology from the user profile or presentation personality 108.

The invention may provide special purpose presentation capabilities for long text strings, tables, lists and other large results sets. Domain agents 156 may use special formatting templates for such results. The system agent 150 can provide special criteria handlers 152 for presentation and user commands for large results sets. The presentation templates used by the domain agents for large results sets typically include methods for summarizing the results and then allowing the user to query the result in more detail. For example, initially only short summaries, such as headlines or key numbers, are presented. The user can then query the results set further. The criteria handlers provide users with the capability to browse large results sets. Commands provided by the criteria handlers for large results sets include, stop, pause, skip, rewind, start, and forward.

Some information, in formats such as video, pictures and graphics, may be best presented in a displayed format. The domain agents 156 apply suitable presentation templates in these cases and present the information through the graphical user interface 114. The system agent 150 provides special criteria handlers 152 for presentation and user commands for display presentations and control.

Although particular embodiments of the invention have been shown and described, it will be understood that it is not intended to limit the invention to the embodiments that are disclosed and it will be obvious to those skilled in the art that various changes and modifications may be made without departing from the spirit and scope of the invention. Thus, the invention is intended to cover alternatives, modifications, and equivalents, which may be included within the spirit and scope of the invention as defined by the claims.

We claim:

1. A mobile system responsive to a user generated natural language speech utterance, comprising:
   a speech unit connected to a computer device on a vehicle, wherein the speech unit receives a natural language speech utterance from a user and converts the received natural language speech utterance into an electronic signal; and
   a natural language speech processing system connected to the computer device on the vehicle, wherein the natural language speech processing system receives, processes, and responds to the electronic signal using data received from a plurality of domain agents, wherein the natural language speech processing system includes:
      a speech recognition engine that recognizes at least one of words or phrases from the electronic signal using at least the data received from the plurality of domain agents, wherein the data used by the speech recognition engine includes a plurality of dictionary and phrase entries that are dynamically updated based on at least a history of a current dialog and one or more prior dialogs associated with the user;
      a parser that interprets the recognized words or phrases, wherein the parser uses at least the data received from the plurality of domain agents to interpret the recognized words or phrases, wherein the parser interprets the recognized words or phrases by:
         determining a context for the natural language speech utterance;
         selecting at least one of the plurality of domain agents based on the determined context; and
         transforming the recognized words or phrases into at least one of a question or a command, wherein the at least one question or command is formulated in a grammar that the selected domain agent uses to process the formulated question or command; and
      an agent architecture that communicatively couples services of each of an agent manager, a system agent, the plurality of domain agents, and an agent library that includes one or more utilities that can be used by the system agent and the plurality of domain agents, wherein the selected domain agent uses the communicatively coupled services to create a response to the formulated question or command and format the response for presentation to the user.

2. The mobile system according to claim 1, wherein the natural language speech processing system further includes an event manager that:
   sends and receives events to a plurality of components of the natural language speech processing system to coordinate interaction among the plurality of components of the natural language speech processing system; and
   provides a multi-threaded environment that enables the natural language speech processing system to provide a plurality of real-time responses to a plurality of questions or commands in a plurality of different contexts across a plurality of overlapping or interleaved sessions with the user.

3. The mobile system according to claim 2, wherein the multi-threaded environment of the event manager further enables the natural language speech processing system-to use a plurality of the domain agents to provide the plurality of real-time responses to the plurality of questions or commands in the plurality of different contexts across the plurality of overlapping or interleaved sessions with the user.

4. The mobile system according to claim 1, wherein the response includes a text string and the natural language speech processing system further includes a text to speech engine that creates an encoded speech message to be annunciated to the user.

5. The mobile system according to claim 1, wherein the selected domain agent includes data associated with at least one of driving directions, travel information, restaurant information, systems information for the vehicle, safety information, or entertainment information.

6. The mobile system according to claim 1, wherein the selected domain agent includes data for communicating with one or more devices.

7. The mobile system according to claim 6, wherein the data for communicating with the one or more devices includes data for controlling the one or more devices.

8. The mobile system according to claim 6, wherein at least one of the one or more devices is connected to the vehicle.

9. The mobile system according to claim 8, wherein at least one of the speech unit or the natural language speech processing system is located remotely from the vehicle and connected to the computer device on the vehicle through a communication link.

10. The mobile system according to claim 8, wherein the at least one device connected to the vehicle includes at least one of a navigation system, a monitoring system, a security system, a control system, or a media system connected to the vehicle.

11. The mobile system according to claim 8, further comprising a telematics control unit that interfaces with the at least one device connected to the vehicle.

12. The mobile system according to claim 11, wherein at least one of the speech unit or the natural language speech processing system is embedded in the telematics control unit.

13. The mobile system according to claim 1, wherein the communicatively coupled services include at least one remotely located service and the selected domain agent includes data for controlling or communicating with the remotely located service.

14. The mobile system according to claim 13, wherein the remotely located service includes at least one of a payment service provider, a customer relationship management system, a specialized service, a location service, or an emergency service.

15. The mobile system according to claim 13, wherein the speech unit and the natural language speech processing system each include respective transceivers that communicate via a communication network.

16. The mobile system according to claim 15, wherein the communication network is a wide area wireless network.

17. The mobile system according to claim 15, wherein the transceiver is a wide-area RF transceiver.

18. The mobile system according to claim 1, wherein the speech unit includes a speech coder that converts the natural language speech utterance into the electronic signal, an array microphone that receives the natural language speech utterance, and a filter that optimizes a signal to noise ratio of the electronic signal.

19. The mobile system according to claim 18, wherein the filter employs adaptive echo cancellation to optimize the signal to noise ratio of the electronic signal.

20. The mobile system according to claim 18, wherein the array microphone is at least a one-dimensional array.

21. The mobile system according to claim 18, wherein the speech coder uses an adaptive lossy audio compression to convert the natural language utterance into the electronic signal.

22. The mobile system according to claim 1, wherein the speech unit is located remotely from the natural language speech processing system.

23. The mobile system according to claim 1, further comprising at least one of a display or a keypad.

24. The mobile system according to claim 1, wherein at least one of the speech unit or the natural language speech processing system is embedded in at least one of the vehicle, a handheld device connected to the vehicle, a fixed computer device connected to the vehicle, or a mobile computer device connected to the vehicle.

25. The mobile system according to claim 1, wherein the communicatively coupled services include at least one shared network resource.

26. The mobile system according to claim 1, wherein the agent manager:
   loads and initializes the system agent and the plurality of domain agents in response to the natural language speech processing system booting up;
   unloads the system agent and the plurality of domain agents in response to the natural language speech processing system shutting down;
   performs license management for the plurality of domain agents and content stored in one or more databases; and
   searches a network to find a source for a suitable agent in response to the question or command requiring an agent not currently loaded on the natural language speech processing system.

27. The mobile system according to claim 1, wherein the one or more utilities included in the agent library include at least one of a text and string handling, function, a network communications function, a database lookup and management function, a fuzzy and probabilistic evaluation function, or a text to speech formatting function.

28. The mobile system according to claim 27, wherein the system agent:
   provides default functionality and foundation services that can be used by each of the plurality of domain agents;
   uses one or more of the utilities included in the agent library to perform one or more of the text and string handling function, the network communications function, the database lookup and management function, the fuzzy and probabilistic evaluation function, or the text to speech formatting function; and manages one or more criteria handlers used to determine the context for the natural language speech utterance, wherein the one or more criteria handlers provide context sensitive procedures for extracting information from the at least one question or command.

29. The mobile system according to claim 1, wherein the speech recognition engine:

determines an identity of the user based on unique voice characteristics of the user; and tags the recognized words or phrases with the identity of the user to associate the utterance with the user and the current dialog in the natural language speech processing system.

30. The mobile, system according to claim 1, wherein the plurality of dictionary and phrase entries used by the speech recognition engine are further dynamically updated based on one or more dynamic fuzzy set possibilities or prior probabilities derived from the history of the current dialog and the one or more prior dialogs.

31. A method responsive to a user generated natural language speech utterance, comprising:

receiving, at a speech unit connected to a computer device on a vehicle, a natural language speech utterance from a user, wherein the speech unit converts the received natural language speech utterance into an electronic signal;

recognizing, at a speech recognition engine connected to the computer device on the vehicle, at least one of words or phrases from the electronic signal, wherein the speech recognition engine uses at least data received from a plurality of domain agents to recognize the words or phrases, wherein the data used by the speech recognition engine includes a plurality of dictionary and phrase entries that are dynamically updated based on at least a history of a current dialog and one or more prior dialogs associated with the user;

determining, at a parser connected to the computer device on the vehicle, a context for the natural language speech utterance;

selecting, at the parser connected to the computer device on the vehicle, at least one of the plurality of domain agents based on the determined context;

transforming, at the parser connected to the computer device on the vehicle, the recognized words or phrases into at least one of a question or a command, wherein the at least one question or command is formulated in a grammar that the selected domain agent uses to process the formulated question or command; and forwarding the formulated question or command to an agent architecture connected to the computer device on the vehicle, wherein the agent architecture communicatively couples services of each of an agent manager, a system agent, the plurality of domain agents, and an agent library that includes one or more utilities that can be used by the system agent and the plurality of domain agents, wherein the selected domain agent uses the communicatively coupled services to create a response to the formulated question or command and format the response for presentation to the user.

32. The method according to claim 31, wherein the speech unit includes an array microphone that receives the natural language speech utterance, a speech coder that converts the natural language speech utterance into the electronic signal, and a filter that optimizes a signal to noise ratio of the electronic signal.

33. The method according to 32, wherein the filter removes background noise from the electronic signal to optimize the signal to noise ratio of the electronic signal.

34. The method according to 32, wherein the filter employs at least one of adaptive echo cancellation or adaptive lossy audio compression to optimize the signal to noise ratio of the electronic signal.

35. The method according to claim 31, the wherein the selected domain, agent includes data for controlling or communicating with at least one of a navigation system, a monitoring system, a security system, a control system, or a media system connected to the vehicle.

36. The method according to claim 31, wherein the selected domain agent includes data associated with at least one of driving directions, travel information, restaurant information, systems information for the vehicle, safety information, or entertainment information.

37. The method according to claim 31, wherein the communicatively coupled services include at least one remotely located service and the selected domain agent includes data for controlling or communicating with the remotely located service.

38. The method according to claim 37, wherein forwarding the formulated question or command to the agent architecture includes transmitting a request to the remotely located service.

39. The method according to claim 38, wherein the remotely located service is associated with a remotely located device.

40. The method according to claim 38, wherein the request is transmitted to the remotely located service via a communication network.

41. The method according to claim 37, wherein the remotely located service includes at least one of a payment service provider, a customer relationship management system, a specialized service, a location service, or an emergency service.

42. The method according to 38, wherein the request is transmitted to the remotely located service via a wide-area RF transceiver.

43. The method according to claim 31, wherein the communicatively coupled services include one or more shared network resources.

44. The method according to claim 43, wherein the shared network resources include a telematics control unit that interfaces with one or more devices connected to the vehicle.

45. The method according to claim 44, wherein the shared network resources further include at least one resource located remotely from the vehicle.

46. The method according to claim 31, further comprising:

executing the question or command in response to determining that the question or command will not create a hazardous condition for the vehicle;

providing interactive guidance to the user to resolve the hazardous condition during the current dialog in response to determining that the question or command will create a hazardous condition for the vehicle; and enabling the user to manually override the hazardous condition, wherein the question or command is executed in response to the user manually overriding the hazardous condition.

47. The method according to claim 31, further comprising:

receiving diagnostic information from one or more sensors connected to the vehicle, wherein the diagnostic information relates to one or more problems with the vehicle;

providing one or more interactive announcements or warnings to the user in response to the diagnostic information received from the one or more sensors; and mediating a solution to the one or more problems with the vehicle during the current dialog with the user.

48. The method according to claim 47, wherein the solution to the one or more problems includes at least one of scheduling service for the vehicle, summoning help to the vehicle over one or more communication links, providing remedial instructions that address one or more of the problems, ordering one or more parts for the vehicle, or providing a cost estimate for the scheduled service.

49. The method according to claim 31, further comprising:
detecting an accident situation in response to information received from one or more sensors connected to the vehicle;
interacting with the user to determine at least one of a nature of the accident situation or a condition of the user; and
reporting the accident situation to emergency personnel over a communications link.

50. The method according to claim 49, wherein reporting the accident situation includes:
reporting at least one of the nature of the accident situation or the condition of the user to the emergency personnel; and
establishing a voice channel to enable communication between the user and the emergency personnel.

51. The method according to claim 31, further comprising:
determining that the recognized words or phrases include at least one predetermined panic or emergency words or phrases indicating that a crime is occurring; and
summoning help to the vehicle over one or more communication links in response to the recognized words or phrases including the at least one predetermined panic or emergency words or phrases indicating that the crime is occurring.

52. The method according to claim 31, further comprising providing interactive guidance to assist the user in performing one or more maneuvers to operate the vehicle.

53. The method according to claim 31, further comprising:
providing interactive routing information to coordinate a rendezvous with one or more other vehicles in communication with the vehicle; and
establishing a voice channel to enable communication between the user and one or more users in the one or more other vehicles.

54. The method according to claim 31, further comprising:
detecting that the vehicle is approaching or has exceeded a travel limit for the vehicle;
providing interactive guidance for returning to the travel limit or for not exceeding the travel limit; and
mediating a negotiation with the user to extend the travel limit.

55. The method according to claim 31, further comprising providing interactive guidance to relating to one or more tasks for the user based on a location of the vehicle.

\* \* \* \* \*